US012611897B2

(12) United States Patent (10) Patent No.: US 12,611,897 B2
Corghi (45) Date of Patent: Apr. 28, 2026

(54) TIRE CHANGING APPARATUS

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 504 days.

(21) Appl. No.: 17/999,948

(22) PCT Filed: May 27, 2021

(86) PCT No.: PCT/IB2021/054633
§ 371 (c)(1),
(2) Date: Nov. 28, 2022

(87) PCT Pub. No.: WO2021/240422
PCT Pub. Date: Dec. 2, 2021

(65) Prior Publication Data
US 2023/0278376 A1 Sep. 7, 2023

(30) Foreign Application Priority Data
May 29, 2020 (IT) ........................ 102020000012874

(51) Int. Cl.
*B60C 25/138* (2006.01)
*B60C 25/05* (2006.01)
(52) U.S. Cl.
CPC ........ *B60C 25/138* (2013.01); *B60C 25/0536* (2013.01); *B60C 25/0566* (2013.01)
(58) Field of Classification Search
CPC .... F15B 11/22; F15B 11/782; B60C 25/0536; B60C 25/0566; B60C 25/138

USPC .......................................................... 91/515
See application file for complete search history.

(56) References Cited

U.S. PATENT DOCUMENTS 2,815,803 A 12/1957 Bochert
4,335,561 A * 6/1982 Swanson ................ A01D 46/08
56/DIG. 15
6,029,450 A * 2/2000 Wittich ................... F15B 7/005
91/171
(Continued)

FOREIGN PATENT DOCUMENTS

CN 108340990 A 7/2018
EP 2 629 992 B1 2/2015
(Continued)

OTHER PUBLICATIONS

International Search Report and Written Opinion for corresponding International Application No. PCT/IB2021/054633 mailed Sep. 3, 2021.

*Primary Examiner* — Michael Leslie
(74) *Attorney, Agent, or Firm* — Chrisman Gallo Tochtrop LLC

(57) ABSTRACT
An apparatus for mounting and demounting a tyre relative to a corresponding wheel rim, wherein the apparatus includes: a wheel-holder unit, configured to receive and lock the wheel at an operating position and to set it in rotation about an axis of rotation; a plurality of tools, configured to interact with the tyre to mount and/or demount the tyre; a hydraulic circuit comprising a pump; a plurality of hydraulic actuators, connected to the hydraulic circuit; the hydraulic circuit is configured to drive the actuators of the plurality of actuators synchronously.

18 Claims, 8 Drawing Sheets

(56)                    References Cited

U.S. PATENT DOCUMENTS

| | | | | |
|---|---|---|---|---|
| 6,886,619 | B2 * | 5/2005 | Gonzaga | B60C 25/0545 |
| | | | | 157/1.2 |
| 7,537,079 | B2 * | 5/2009 | Krieger | B62D 5/061 |
| | | | | 92/185 |
| 8,286,683 | B2 * | 10/2012 | Jonsson | B60C 25/0524 |
| | | | | 100/232 |
| 8,613,303 | B1 | 12/2013 | Hanneken et al. | |
| 8,770,254 | B1 * | 7/2014 | Hanneken | B60C 25/0548 |
| | | | | 157/1.24 |
| 8,783,326 | B1 * | 7/2014 | Vaninger | B60C 25/0551 |
| | | | | 157/1.24 |
| 9,073,394 | B1 * | 7/2015 | Clasquin | B60C 25/056 |
| 9,227,473 | B2 * | 1/2016 | Sotgiu | B60C 25/138 |
| 10,507,698 | B2 * | 12/2019 | Gonzaga | B60C 25/0545 |
| 10,820,513 | B2 * | 11/2020 | Hunt | F15B 13/021 |
| 2006/0049616 | A1 | 3/2006 | Rogalla et al. | |
| 2010/0307693 | A1 | 12/2010 | Jönsson | |

FOREIGN PATENT DOCUMENTS

| | | | |
|---|---|---|---|
| EP | 2 599 649 | B1 | 7/2017 |
| MO | 2009A000280 | | 11/2009 |
| WO | 2004/050393 | A1 | 7/2004 |
| WO | 2009/061277 | A1 | 5/2009 |

* cited by examiner

TIRE CHANGING APPARATUS

CROSS-REFERENCE TO RELATED APPLICATIONS

This is a National Stage application of PCT international application PCT/IB2021/054633 filed on May 27, 2021, which claims the priority of Italian Patent Application No. 102020000012874, filed May 29, 2020, which are incorporated herein by reference in their entireties.

TECHNICAL FIELD

This invention relates to an apparatus for mounting and demounting a tyre. This invention also relates to a method for demounting a tyre from a respective wheel rim.

BACKGROUND ART

Typically, in apparatuses for mounting and demounting tyres, also known as tyre changing machines or apparatuses, the wheel is received and locked on a wheel-holder unit; one example of a wheel-holder unit is described in patent document EP2599649B1. The tyre is demounted and/or mounted by rotating the wheel and simultaneously interacting with tools, mounted on a tool column, an example of which is provided in patent document EP2629992B1.

In the field of tyre changers, apparatuses are known in which a plurality of tools—for example, bead breaker tools—operate simultaneously on the same tyre bead; examples of such apparatuses are described in patent documents MO2009A000280 and U.S. Pat. No. 2,815,803A1; in prior art documents, however, the tools that operate simultaneously on the same tyre bead are driven by the same actuator; this limits the force that the tools can exert on the bead.

Also known are apparatuses in which a plurality of tools are driven by a plurality of different actuators, connected to the same hydraulic circuit; the hydraulic circuit may also control actuators connected to the wheel-holder unit; examples of such apparatuses are described in patent documents U.S. Pat. No. 8,770,254B1, U.S. Pat. No. 9,073,394B1, U.S. Pat. No. 8,783,326B1 and U.S. Pat. No. 8,613,303B1. In these apparatuses, the problem is how to drive the actuators effectively in such a way to make mounting and/or demounting optimal. More specifically, there is a need to distribute the forces equally among all the actuators so that the force that the tools connected to the actuators exert on the wheel is equally distributed between one tool and another. There is also a need to precisely position the tools connected to the actuators so that they touch the wheel at the same time.

Further tyre changers are disclosed in patent documents WO2009/061277A1, CN108340990A.

DISCLOSURE OF THE INVENTION

This invention has for an aim to provide an apparatus for mounting and demounting a tyre relative to a vehicle wheel rim and a demounting method to overcome at least one of the above mentioned drawbacks of the prior art.

This aim is fully achieved by the apparatus and method of this disclosure as characterized in the appended claims.

According to an aspect of it, this disclosure relates to an apparatus for mounting and/or demounting a tyre relative to a corresponding wheel rim. More specifically, the wheel may be a racing car wheel 18 inches in diameter; the width of the wheel may be, for example, less than or equal to 14 inches. The apparatus comprises a wheel-holder unit configured to receive and lock the wheel at an operating position and to set it in rotation about an axis of rotation. The apparatus comprises a plurality of tools configured to interact with the tyre to mount and/or demount the tyre.

The apparatus comprises a hydraulic (or electrohydraulic) circuit. The hydraulic circuit is filled with a fluid. The fluid is preferably liquid and, still more preferably, is oil. The hydraulic circuit includes a pump. The apparatus comprises a plurality of actuators. Preferably, the actuators are hydraulically driven: that is, they are hydraulic actuators; the actuators are connected to the hydraulic circuit. Each actuator of the plurality of actuators defines an internal space and includes a piston which is slidable inside the internal space; the piston divides the internal space into an opening chamber and a closing chamber. By "opening chamber" is meant the chamber which, when filled with fluid (oil) causes the egress of the piston stem.

The hydraulic circuit is configured to drive the actuators of the plurality of actuators synchronously.

It should be noted that the actuators which are driven synchronously can be connected to respective tools of the plurality of tools and/or to other components of the apparatus such as, for example, the wheel-holder unit. More specifically, the plurality of actuators includes a first actuator and a second actuator. Preferably, the first actuator and the second actuator (and any other actuators of the plurality) each include a respective cylinder defining the internal space. For each first actuator and second actuator (and any other actuators of the plurality) the piston includes a stem and a plunger.

In an embodiment, the actuators of the plurality are connected to each other in series, in a master-slave configuration. The opening chamber of the first actuator is operatively connected to the pump to receive fluid from the pump and the opening chamber of the second actuator is operatively connected to the closing chamber of the first actuator to receive fluid from the first actuator. Thus, the first actuator acts as "master" actuator and the second actuator acts as "slave" actuator. In effect, the first actuator ("master") operatively receives fluid from the pump, while the second actuator ("slave") operatively receives the fluid from the first actuator, and so on for any further "slave" actuators which receive oil from the second actuator, in cascade. More specifically, the hydraulic circuit includes a connecting branch which interconnects the second chamber of the first actuator with the first chamber of the second actuator.

In this embodiment, the cylinder of the first actuator is preferably larger in diameter than the cylinder of the second actuator. The stem of the first actuator is larger in cross section (or diameter if it is cylindrical) than the stem of the second actuator. It should be noted that the actuator may include a chamber that is other than cylindrical in shape (for example, it may be a parallelepiped). Whatever the case, the cross section of the chamber of the first actuator is larger than the cross section of the chamber of the second actuator. This feature is useful in that the stem is preferably positioned in the closing chamber; since the stem occupies part of the space of the closing chamber of the first actuator, the amount of fluid (usually oil) which passes from the closing chamber of the first actuator to the opening chamber of the second actuator is less than the amount that would go into a chamber the size of the closing chamber of the first actuator without the stem in it; hence, the second actuator has a cylinder that is smaller in cross section than the cylinder of the first actuator to compensate for the fact that part of the closing chamber of the first actuator is occupied by the stem.

In another embodiment, the actuators of the plurality of actuators are connected to each other in parallel. More specifically, the pump delivery section is connected to the opening chambers of the actuators of the plurality of actuators and the pump return section is connected to the closing chambers of the actuators of the plurality of actuators. In this embodiment, the apparatus preferably also comprises a flow dividing device located between the delivery section of the pump and the opening chambers of the actuators of the plurality of actuators. In an embodiment, the flow dividing device comprises a plurality of mechanically interconnected volumetric gear pumps; each volumetric gear pump has a first port connected to the (central) pump of the hydraulic circuit and a second port connected to the opening chamber of a respective actuator of the plurality of actuators. The flow dividing device is operable in a first configuration, in which the first port of each volumetric pump acts as intake port and the second port acts as delivery port to send the fluid from the pump assembly to the actuators, and in a second configuration, in which the first port of each volumetric pump acts as delivery port and the second port acts as intake port to make the fluid return from the actuators to the tank the pump assembly is connected to. The flow dividing device comprises or defines a pressure compensator to keep the same pressure in the cylinders of the actuators of the plurality of actuators, independently of the resistance load on them.

In an embodiment, the hydraulic circuit comprises a rephasing or realignment system. The rephasing system is configured to automatically realign the actuators of the plurality of actuators. In effect, oil leaks may cause the actuators to go out of phase so the actuator pistons no longer move simultaneously, in phase or aligned with each other. The rephasing system comprises an electronic card and one or more electrovalves controlled by the electronic card. The one or more electrovalves are located in respective one or more realignment branches of the hydraulic circuit. The one or more electrovalves are configured to limit (or eliminate) fluid leakage.

The electronic card is programmed to open the one or more electrovalves, responsive to a predetermined event, to establish (additional) fluid communication between the actuators of the plurality of actuators. More specifically, opening the electrovalves establishes fluid communication between the opening chambers of the actuators. It should be noted that the one or more electrovalves are preferably double seal electrovalves in order to prevent oil leaks when they are closed.

More specifically, in each actuator of the plurality of actuators, the piston is slidable in the internal space between a top dead centre (or first dead centre) and a bottom dead centre (or second dead centre). At the top dead centre, the opening chamber has its maximum size and the closing chamber has its minimum size. At the bottom dead centre, the opening chamber has its minimum size and the closing chamber has its maximum size. The rephasing system comprises a sensor (or at least one sensor) associated with the plurality of actuators (or the at least one actuator); the sensor is configured to send a position signal to the electronic card, indicating the position of the piston at a predetermined position, and the electronic card is configured to open the one or more electrovalves, responsive to receiving the position signal from the sensor. More specifically, the sensor is configured to send the position signal to the electronic card responsive to detecting the piston at the bottom dead centre or at a predetermined distance from the bottom dead centre. The predetermined distance may be between 1 cm and 3 cm (for example, 2 cm).

Preferably, the electronic card includes a timer, configured to count a predetermined length of time. The predetermined length of time is preferably at least 2 seconds (for example, 3 seconds). The control unit is configured to reclose the one or more electrovalves when the predetermined length of time has elapsed. Thus, the control unit is configured to open the one or more electrovalves in response to the position signal, and to leave them open for the predetermined length of time to allow realigning the actuators. After that, during the movement of the actuator pistons, the electrovalves will be closed. It should also be noted that the electrovalves are also open at an initial stage of filling the circuit with the fluid (for example, the oil).

In the embodiment in which the actuators are connected in series, the rephasing system includes a number of electrovalves (hence of realignment branches) which is preferably equal to the number of actuators of the plurality of actuators. In this case, the rephasing circuit preferably also includes, for each electrovalve, a calibrated throttle; preferably, the calibrated throttle is located in the respective realignment branch in which the electrovalve is located. The realignment branches interconnect the branches of the hydraulic circuit with each other and each of which connects a respective actuator to the distributor (or the flow divider). It should be noted that at least one realignment branch interconnects the opening chambers of one pair of actuators of the plurality of actuators. More specifically, between the opening chamber of the first actuator and the opening chamber of the second actuator there is a first realignment branch on which an electrovalve and, preferably, a calibrated throttle are connected; between the opening chamber of the second actuator and the opening chamber of a third actuator, if any, there is a second realignment branch on which an electrovalve and, preferably, a calibrated throttle are connected; in the case where there are three actuators, there is also a third realignment branch on which are connected an electrovalve and a calibrated throttle which interconnects the opening chamber of the third actuator and the closing chamber of the third actuator. Generally speaking, therefore, each realignment branch except the last one interconnects the opening chambers of a pair of consecutive actuators and the last realignment branch interconnects the opening chamber and the closing chamber of the same (last) actuator.

In the embodiment in which the actuators are connected in parallel, the rephasing circuit comprises a number of electrovalves (hence of realignment branches) which is one less than the number of actuators. Preferably, each electrovalve is positioned in a respective realignment branch which connects the opening chambers of a pair of hydraulic actuators. More generally speaking, each electrovalve is located in a realignment branch which interconnects a pair of branches connecting the flow divider with respective cylinders.

In an embodiment, the plurality of tools includes a plurality of lower bead breakers (or bead breakers).

In an example, the bead breakers of the plurality of bead breakers are configured to simultaneously grip the same tyre bead. In an example, the bead breakers of the plurality of bead breakers are configured to simultaneously grip the bottom tyre bead and are oriented towards the same side of the wheel (the wheel having a first and a second side, opposite to one another). In an example, the bead breakers of the plurality of bead breakers are movable by translation along respective axes (of translation) disposed in parallel with the axis of the wheel-holder unit; the movement is a movement towards or away from the wheel. The movement of the bead breakers is synchronous (towards or away from the wheel: that is, from the bottom side wall of the tyre). In an example, the bead breakers are also movable transversely to the respective axes of translation, radially relative to the axis of rotation of the wheel-holder unit; in the radial movement, too, the bead breakers are synchronized as they move towards or away from the axis of the wheel-holder unit. The radial movements may be determined by cams or other mechanisms or by additional actuators.

The lower bead breakers are movable by the effect of the plurality of actuators between a rest position, where they are away from the tyre of the wheel positioned at the operating position, and a working position, where they interact with a (single) side wall (the bottom one) of the wheel tyre. It should be noted that the term "bottom sidewall" refers to the wheel positioned with its axis directed vertically, so that one sidewall is at a height lower than the other sidewall and is therefore called "bottom" sidewall. If the wheel were positioned with its axis directed horizontally, the term "bottom sidewall" in this disclosure might be replaced by the term "first sidewall" or "second sidewall". At the working position, the bead breakers of the plurality of lower bead breakers are at a first vertical height and, at the rest position, the bead breakers of the plurality of lower bead breakers are at a second vertical height, lower than the first vertical height. Each actuator of the plurality of actuators is associated with a bead breaker of the plurality of (lower) bead breakers to move between the rest position and the working position. More specifically, the apparatus comprises a plurality of arms that support the plurality of bead breakers; each arm of the plurality of arms is movable along a vertical direction, parallel to the weight force, to move the bead breakers of the plurality between the working position and the rest position. The arms are movable by the effect of the actuators of the plurality of actuators; the arms are therefore movable synchronously with each other.

Preferably, the bead breakers of the plurality of lower bead breakers are disposed around the wheel-holder unit; more specifically, they are angularly equispaced from each other.

In an embodiment, the axis of rotation of the wheel-holder unit is parallel to the weight force. The wheel-holder unit comprises a rotary rod which rotates about the axis of rotation; more specifically, the rotary rod has a hole at the top of it; the wheel-holder unit comprises a locking device, configured to interact with the wheel-holder rod and to be removably fixed to it so as to lock the wheel at the operating position. More specifically, the locking device has a lower end and an upper end, where the hole at the top of the rotary rod is adapted to receive the lower end of the locking device, to lock the rim at a position between the top of the rod and the upper end of the locking device.

In an embodiment, the wheel-holder unit also includes a plurality of turrets disposed around the rotary rod, preferably equidistant from the axis of rotation and rotating about the axis of rotation as one with the rotary rod. The turrets of the plurality of turrets have respective lateral surfaces which are configured to abut cylindrical portions of the surface of the rim. That way, the turrets are useful as guides for positioning the wheel and act as a mechanical stop when there is the risk of the rim moving out of alignment on account of the high forces applied to the wheel. In an embodiment, the turrets of the plurality of turrets have respective upper ends configured to abut corresponding rim portions positioned around a central hole of the rim. The turrets are in the form of cylinders, preferably made of plastic. The turrets are movable radially relative to the axis of rotation between a plurality of operating positions. Preferably, the turrets are movable relative to each other in coordinated manner between the plurality of operating positions; they therefore remain equidistant from each other.

In an embodiment, the wheel-holder unit includes a plate, oriented perpendicularly to the axis of rotation and connected to a rotary shaft to rotate about the axis of rotation; the rotary shaft and the plurality of turrets are supported by the plate: that is, they extend from the plate. The plate includes a surface which is configured to supportably receive the wheel. Thus, in the operating position, one sidewall of the rim rests on the plate and a cylindrical portion of the rim surrounds the turrets; preferably, the turrets engage the cylindrical portion of the wheel rim; thus, the turrets perform a function of centring and stabilizing the wheel.

The lower bead breakers are movable, by the effect of the aforesaid actuators, between the rest position, where they are located at a vertical height below the plate, and the working position, where they are located at a vertical height above the plate.

In an embodiment, the axis of rotation is, on the other hand, oriented perpendicularly to the weight force. In this embodiment, the tyre changer is preferably a heavy-duty tyre changer. In this embodiment, the first actuator may be associated with the wheel-holder unit to move it along the axis of rotation; the second actuator may be associated with a tool of the plurality of tools (or with a tool-holder assembly) to move it towards and away from the wheel-holder unit (specifically, along a horizontal direction parallel to the axis of rotation or perpendicularly to the horizontal direction). The first and the second actuator may both be associated with the wheel-holder unit: for example, to move it along the axis of rotation and (simultaneously) to lift it along the vertical direction. The first and the second actuator may also both be associated with a tool-holder assembly (or with a tool): for example, to move towards and away from the wheel-holder unit along a first and a second direction (simultaneously).

In an embodiment, the apparatus comprises a tool-holder column; preferably, the tool-holder column is oriented in parallel with the weight force. The apparatus comprises a working unit which is slidably coupled to the column to move along a lifting axis, parallel to the weight force (that is, to the tool-holder column) and to rotate around the tool-holder column. More specifically, the apparatus (or the working unit) comprises a rotary sleeve, rotatably coupled to the tool-holder column to rotate around it, about the lifting axis; preferably, the rotation of the sleeve is limited to a predetermined angle (for example, 120°) around the column. The working unit is slidably coupled to an outside surface of the sleeve to move by translation relative to the sleeve along the lifting axis. The apparatus comprises a lifting actuator configured to move the working unit relative to the sleeve along the lifting axis, the lifting actuator being preferably a hydraulic actuator. Preferably, the apparatus comprises a control unit connected to the lifting actuator and configured to command the lifting actuator to move the working unit along the lifting axis. The movement of the sleeve around the column, on the other hand, may be performed manually. The apparatus (or the control unit) may comprise a selector switch configured to select a position (that is, a vertical height) of the working unit from a plurality of predetermined positions. More specifically, the selector switch may select the position as a function of a width of the wheel (that is, of the tyre).

The apparatus comprises a first and a second tool-holder assembly, connected to the working unit and extending away from the tool-holder column along respective angularly spaced directions. More specifically, the first and the second tool-holder assembly are connected to the rotary sleeve. Thus, rotating the sleeve—that is, the working unit—allows selecting the first or, alternatively, the second tool-holder assembly. More specifically, the first tool-holder assembly supports a mounting tool and a demounting tool, which are vertically spaced from each other; more specifically, the demounting tool is at a height above the mounting tool; thus, the demounting tool is configured to interact with a top sidewall of the tyre, while the mounting tool is configured to interact with a bottom sidewall of the tyre. The second tool-holder assembly supports a pair of bead breaker discs, which are vertically spaced from each other.

This disclosure also provides a method for demounting and/or mounting a tyre. The method comprises a step of receiving and locking the wheel to a wheel-holder unit. The wheel-holder unit is made according to one or more aspects of this disclosure. The method comprises a step of rotating the wheel about an axis of rotation by rotating the wheel-holder unit. The method comprises a step of moving a plurality of tools, where one or more tools of the plurality interact with the tyre to demount and/or mount the tyre.

Preferably, the method comprises a step of synchronously driving a plurality of hydraulic actuators by means of a hydraulic circuit comprising a pump and connected to the actuators of the plurality of actuators.

In an embodiment, the method comprises a step of automatically realigning the actuators of the plurality of actuators. The step of automatically realigning comprises opening one or more electrovalves located in respective one or more realignment branches of the hydraulic circuit to establish fluid communication between the actuators of the plurality of actuators (specifically between the respective opening chambers). The electrovalves and the realignment branches are made according to one or more aspects of this disclosure.

The plurality of actuators includes a first actuator and a second actuator; the first actuator and the second actuator each define an internal space and include a piston slidable in the internal space; the piston divides the internal space into an opening chamber and a second, closing chamber. The step of driving the first actuator and the second actuator comprises the following steps: feeding pressurized fluid from the pump to the opening chamber of the first actuator; by the effect of the pressurized fluid in the opening chamber of the first actuator, moving the piston of the first actuator and pressurizing the fluid in the closing chamber of the first actuator; causing the pressurized fluid to flow from the closing chamber of the first actuator to the opening chamber of the second actuator through a connecting branch which interconnects the closing chamber of the first actuator with the opening chamber of the second actuator. Hence, the method comprises a step of moving the piston of the second actuator and pressurizing the fluid in the closing chamber of the second actuator. If a third actuator is provided, the method also comprises a step, of causing the pressurized fluid to flow from the closing chamber of the second actuator to the opening chamber of the third actuator through a connecting branch which interconnects the closing chamber of the second actuator with the opening chamber of the third actuator; hence, the method comprises a step of moving the piston of the third actuator and pressurizing the fluid in the closing chamber of the third actuator.

In an embodiment, moving the pistons results in the moving of arms connected to respective lower bead breaker tools which, by the effect of the movement of the pistons, move from the rest position to the working position.

In another embodiment, moving the pistons results in the moving of the wheel-holder unit (or of the chuck), connected to an actuator, and of one or more tools connected to one or more actuators.

BRIEF DESCRIPTION OF DRAWINGS

These and other features will become more apparent from the following detailed description of a preferred embodiment, illustrated by way of non-limiting example in the accompanying drawings, in which.

DETAILED DESCRIPTION OF PREFERRED EMBODIMENTS OF THE INVENTION

Figure 1:
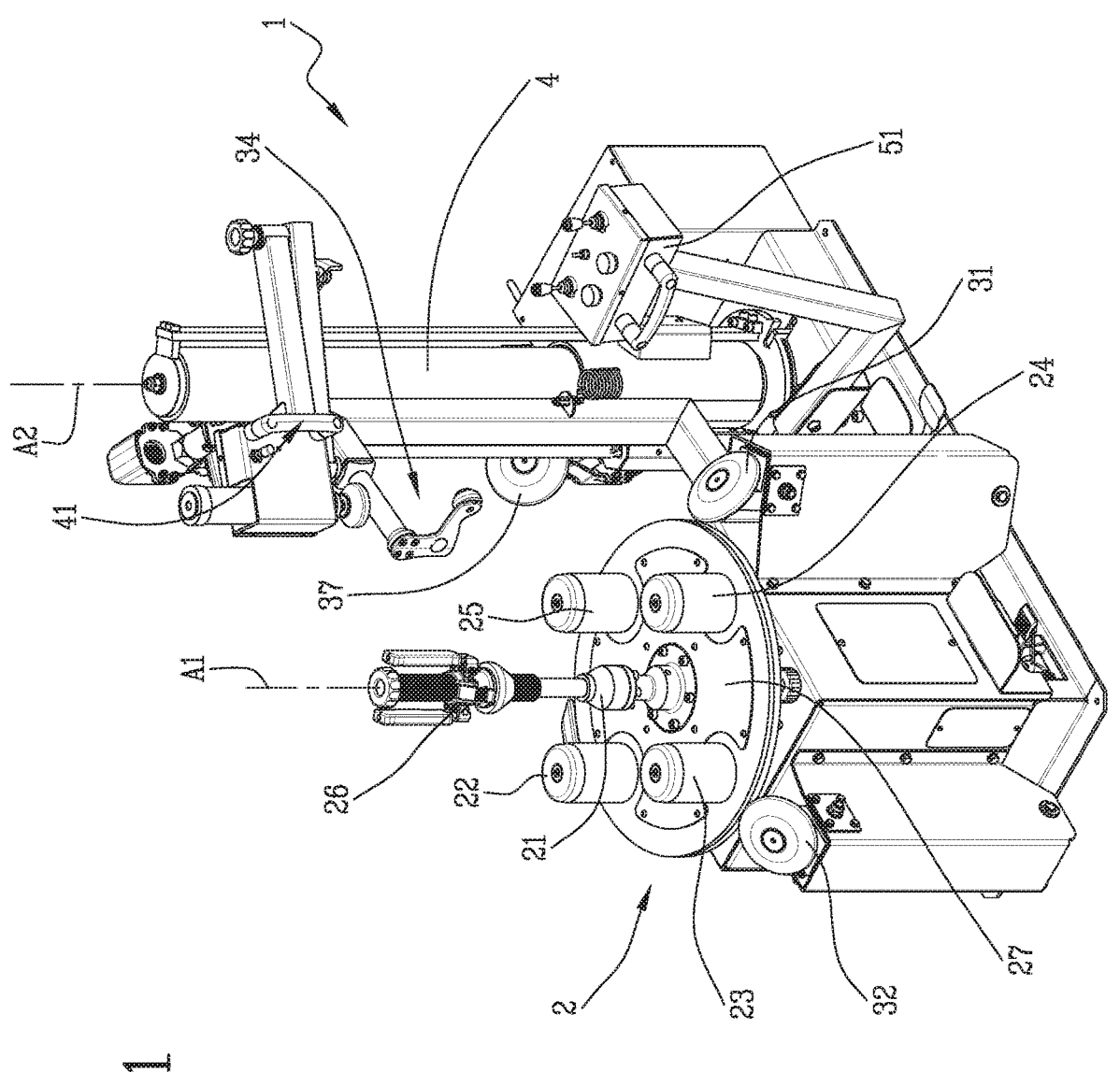
FIG. 1 illustrates an apparatus for mounting and demounting a tyre according to one or more aspects of this disclosure, in a first operating configuration.
Figure 2:
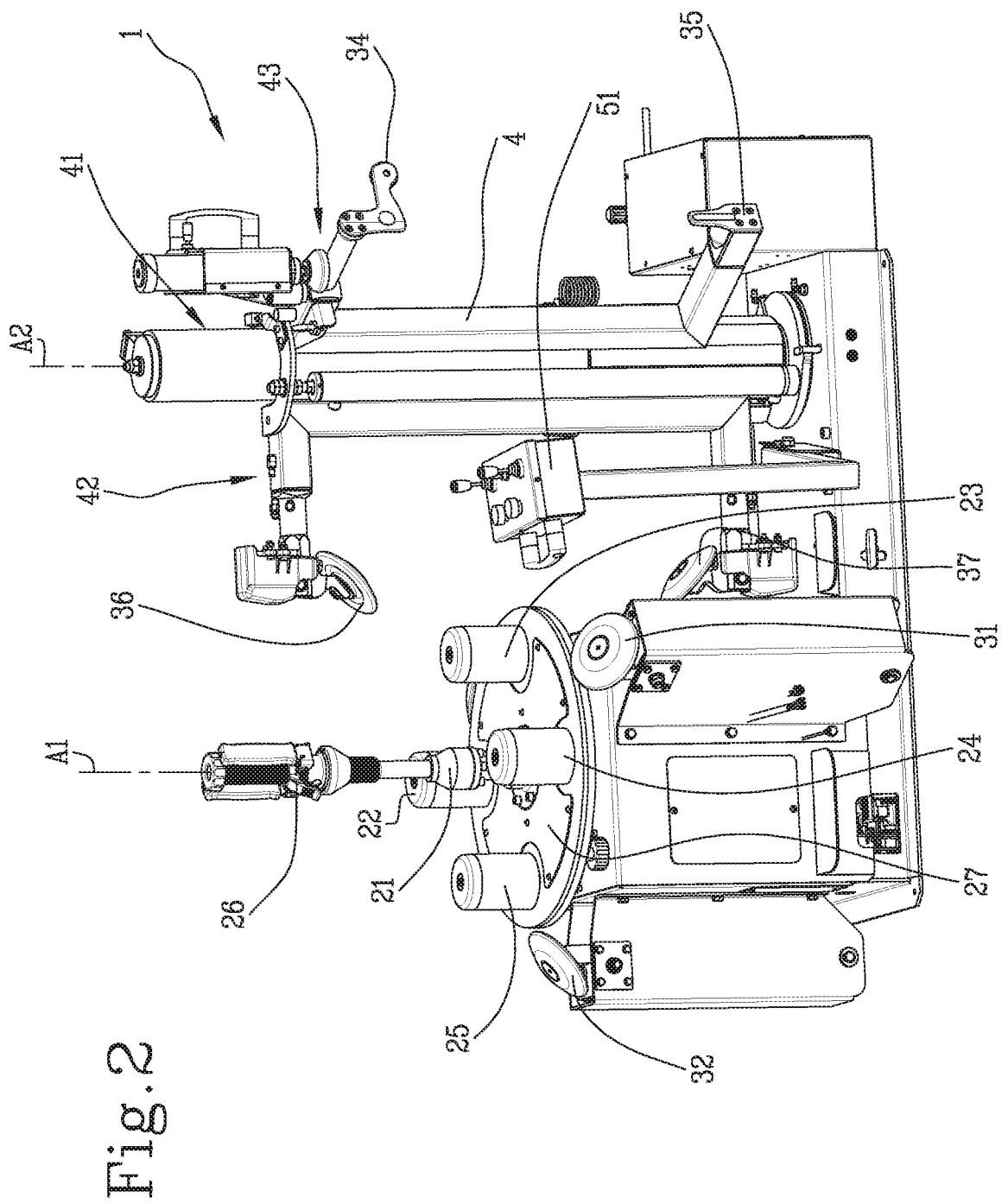
FIGS. 2 and 3 illustrate the apparatus of FIG. 1 in a second operating configuration.
Figure 3:
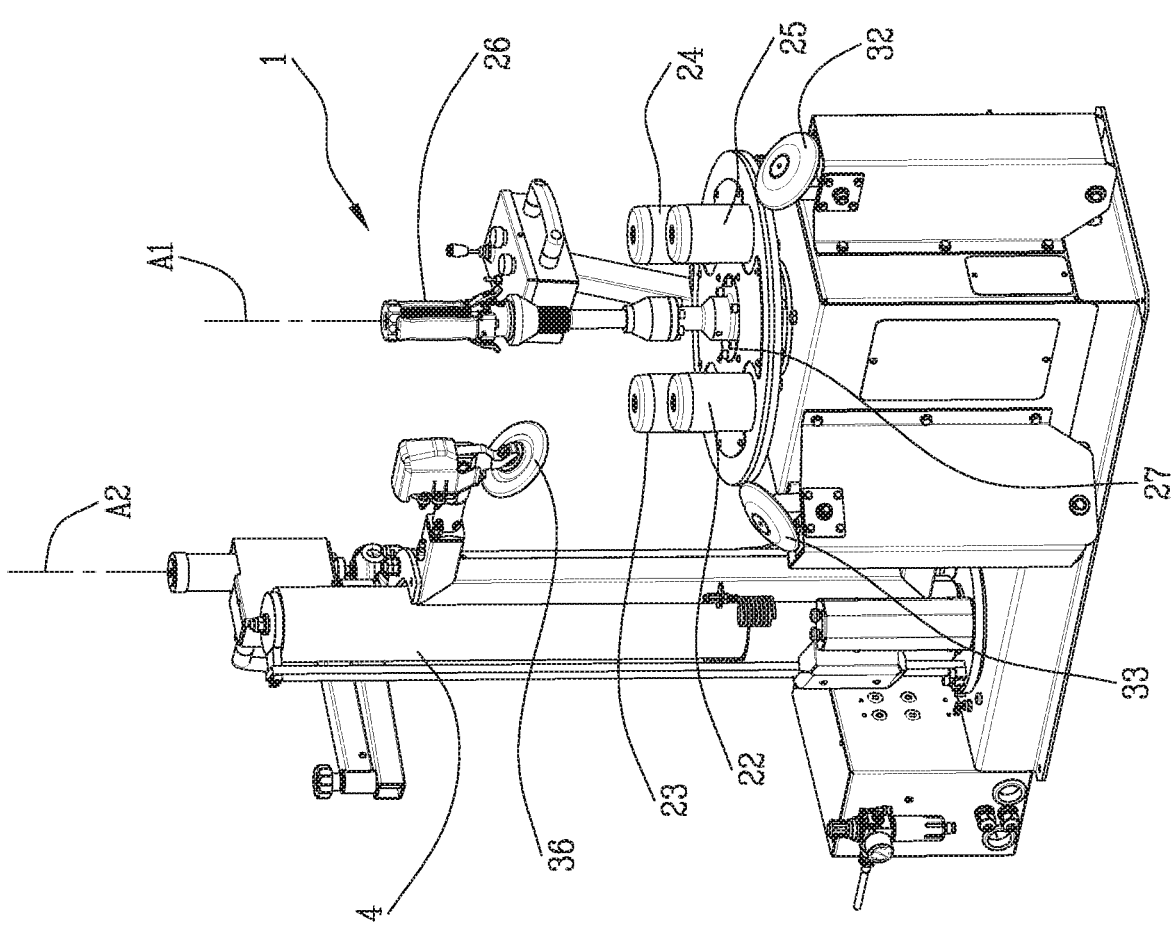
Figure 4:
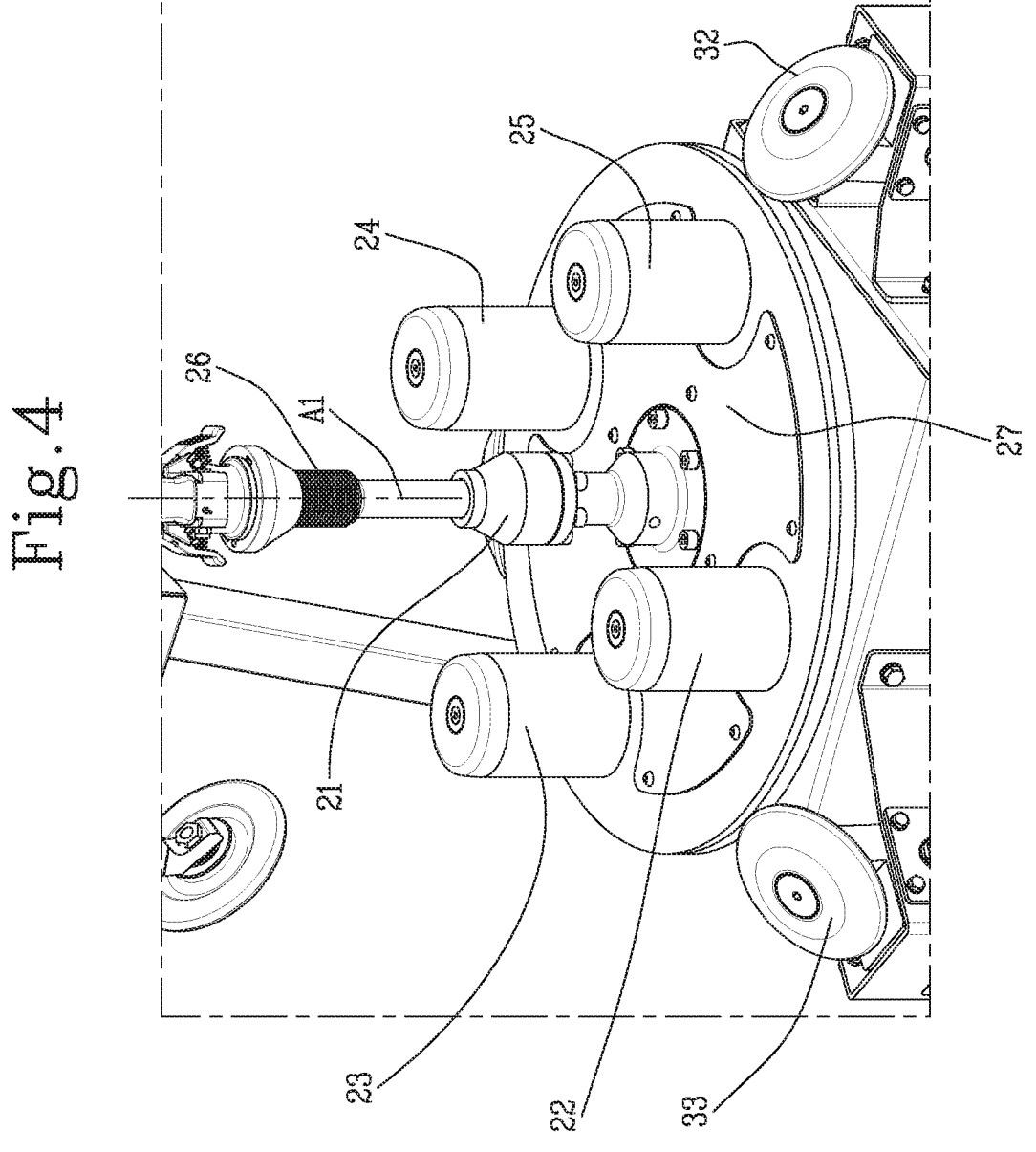
FIGS. 4 and 5 illustrate a detail of the apparatus of FIG. 1.
Figure 5:
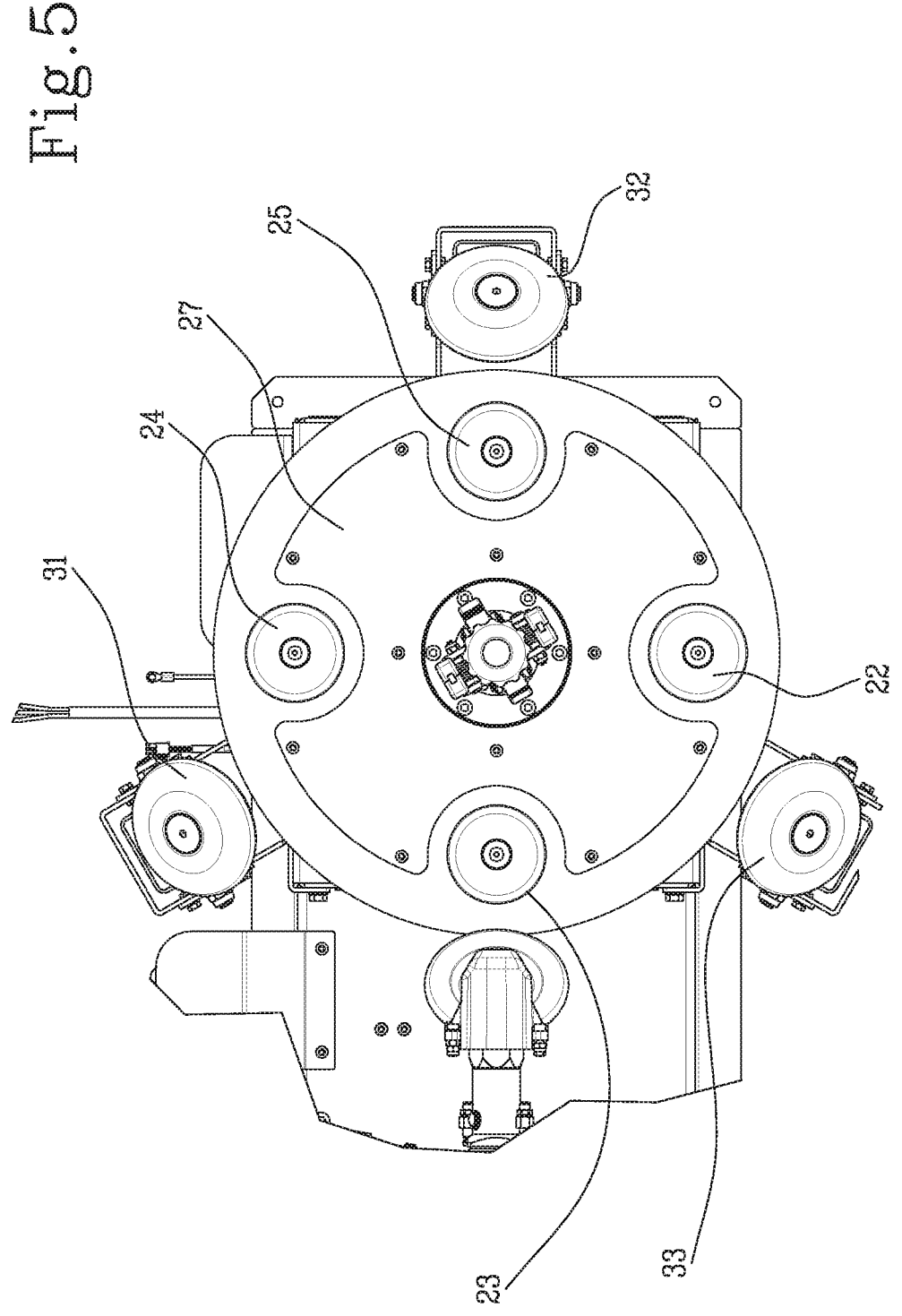
Figure 6:
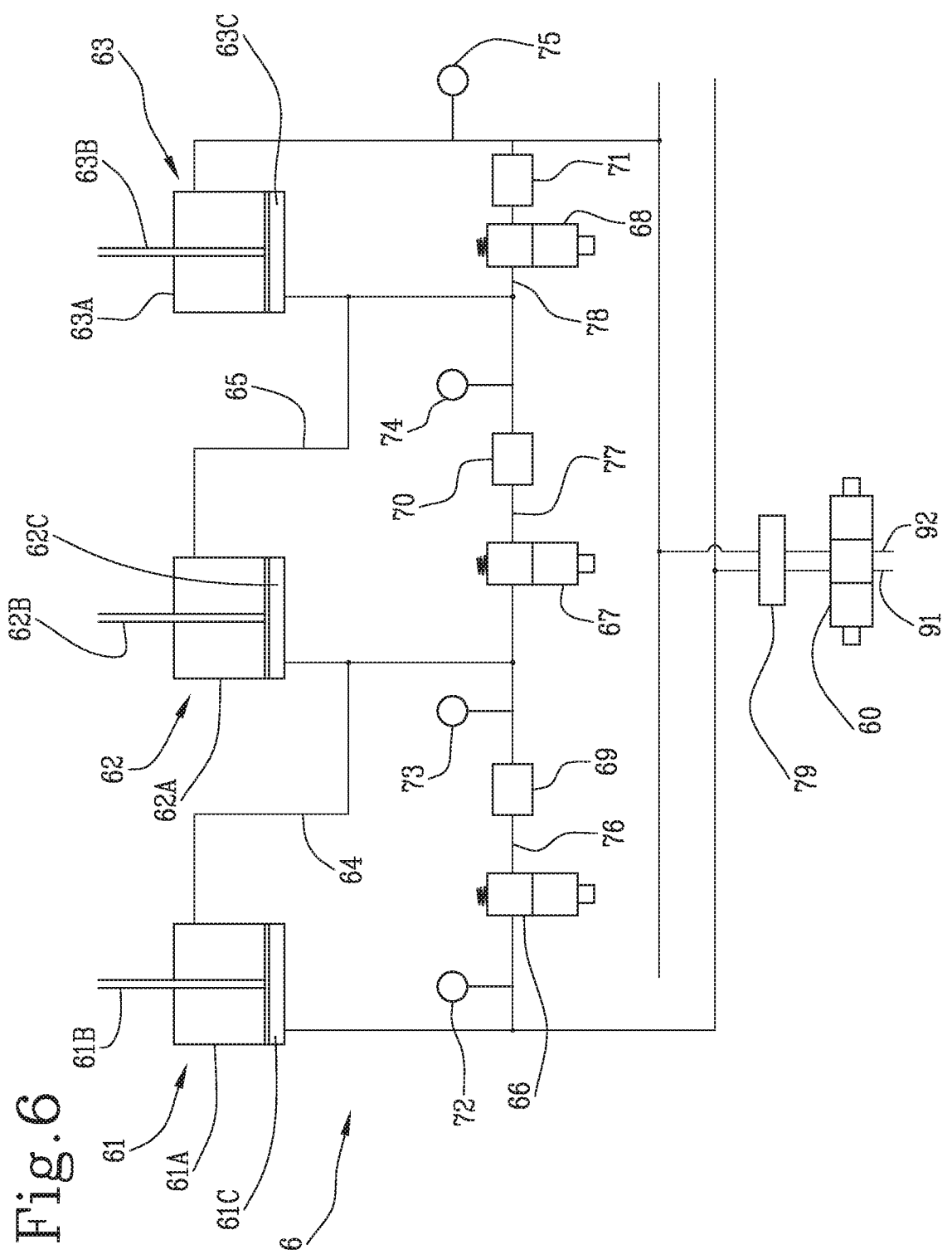
FIG. 6 illustrates a hydraulic circuit of the apparatus of FIG. 1, in an embodiment in which the actuators are connected in series.
Figure 7:
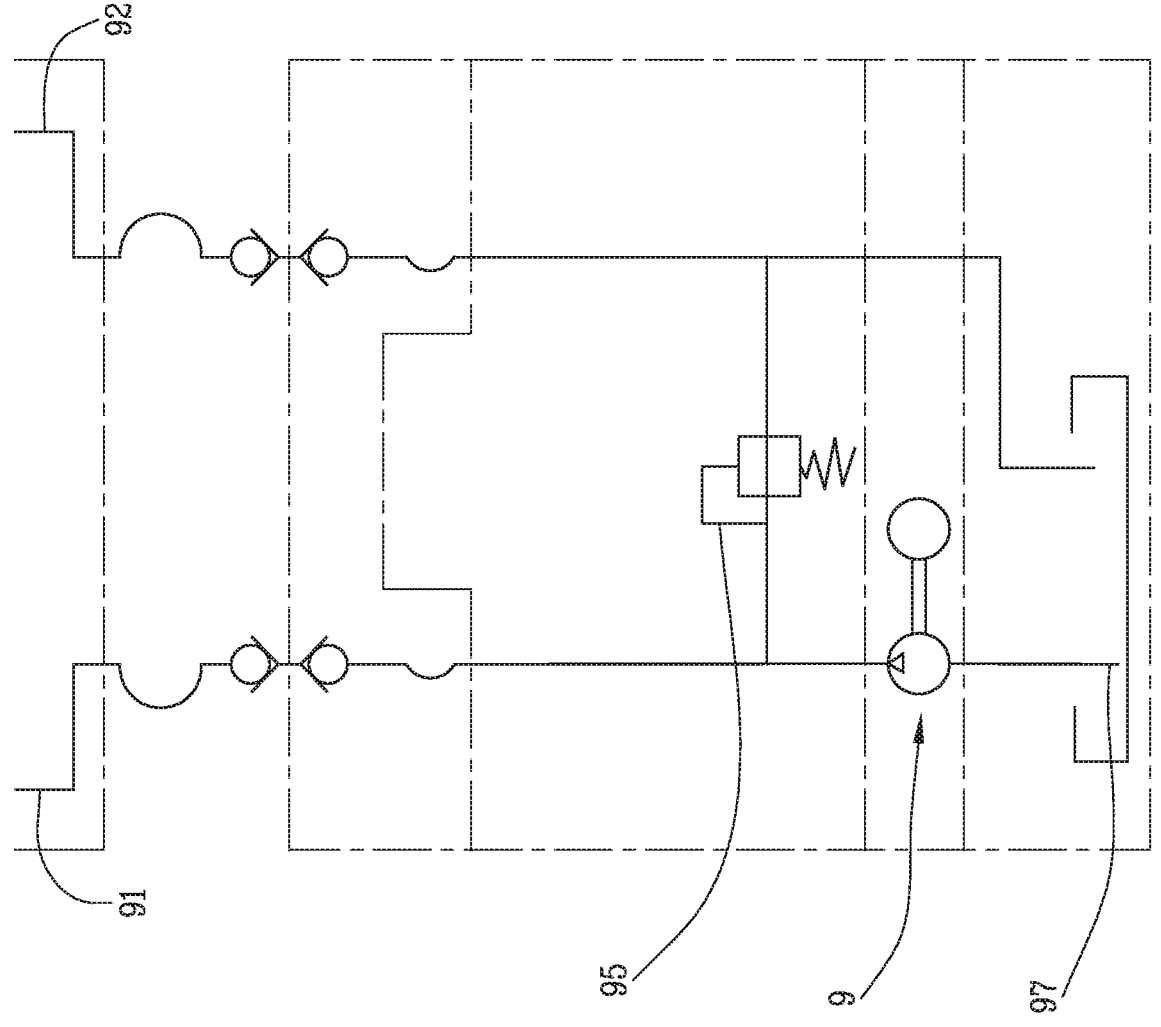
FIG. 7 illustrates a pump assembly to feed the hydraulic circuit of FIG. 6 (or of FIG. 8)
Figure 8:
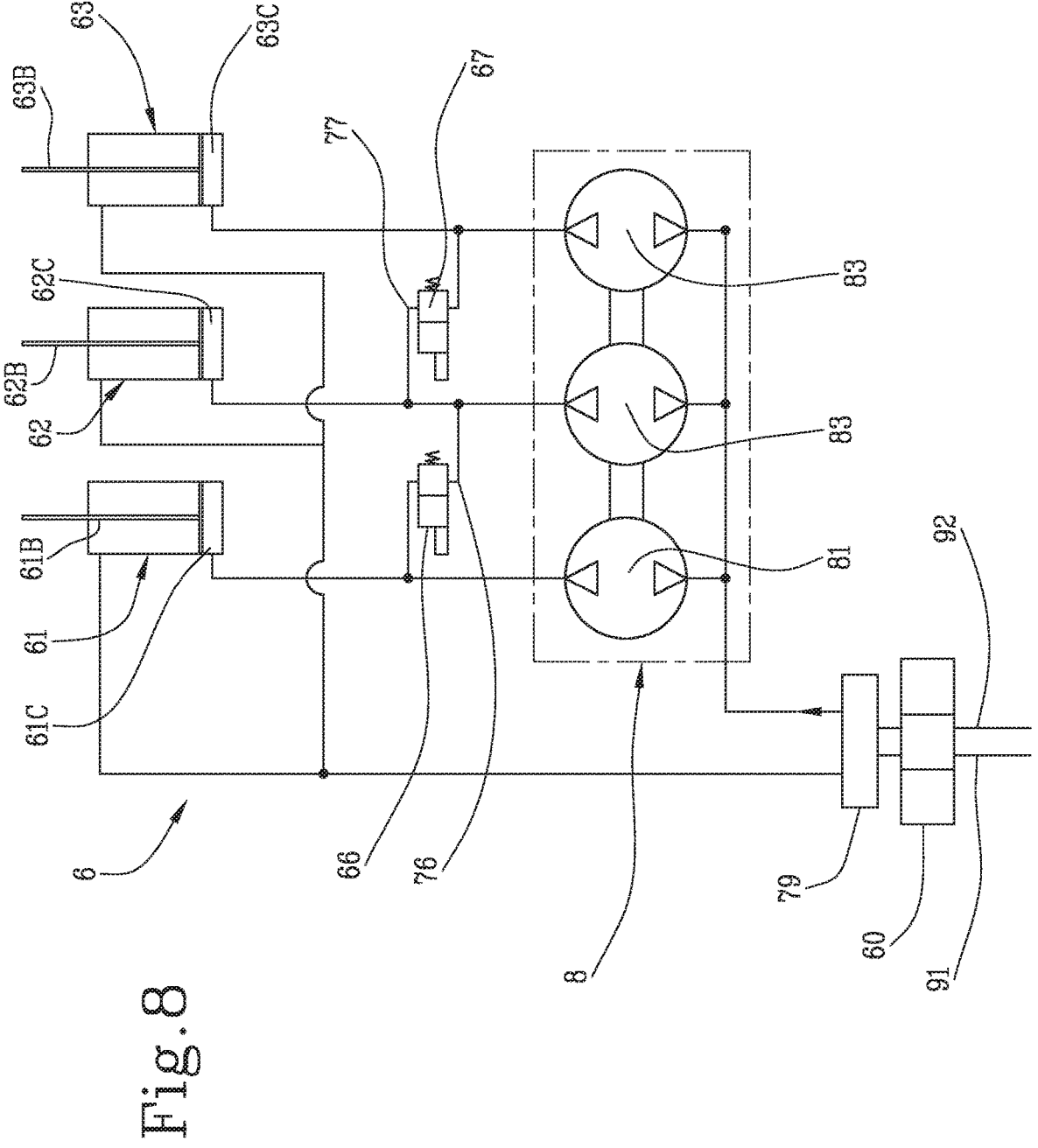
FIG. 8 illustrates the hydraulic circuit of the apparatus of FIG. 1, in an embodiment in which the actuators are connected in parallel.

With reference to the accompanying drawings, the numeral 1 denotes an apparatus for mounting and demounting a tyre.

The apparatus 1 comprises a wheel-holder unit 2. The wheel-holder unit 2 is configured to set a wheel in rotation about an axis of rotation A1 (parallel to the weight force). The wheel-holder unit 2 comprises a rotary rod 21 which rotates about the axis of rotation A1. The wheel-holder unit 2 comprises a plate 27 from which there extends the rotary rod 21 and which also rotates about the axis of rotation A1, as one with the rod. The wheel-holder unit 2 also comprises a first turret 22, a second turret 23, a third turret 24 and a fourth turret 25, all fixed to the plate 27 and also rotating as one with the plate 27 about the axis of rotation A1. The turrets 22, 23, 24 and 25 extend from the plate 27 and are disposed around the rotary rod 21. The wheel-holder unit 2 also includes a locking device 26, removably fixable to the rotary rod 21 to lock the wheel between the plate 27 and the locking device 26. More specifically, the rotary rod 21, at the top of it, has a hole that receives the locking device 26.

The apparatus 1 comprises a plurality of tools. More specifically, the apparatus 1 comprises a first lower bead breaker tool 31, a second lower bead breaker tool 32 and a third lower bead breaker tool 33, disposed around the wheel-holder unit 2 and angularly spaced from each other by 120°. The first, second and third bead breaker tools 31, 32, 33 are movable in respective directions parallel to the axis of rotation A1, between a rest position and a working position, where they are at a greater vertical height than at the rest position. The first, second and third bead breaker tools 31, 32, 33 are shaped like contoured discs whose respective axes of rotation are inclined at a predetermined angle to the axis of rotation A1; the predetermined angle is preferably the same for all three bead breaker tools 31, 32, 33. In the drawings, the first, second and third bead breaker tools 31, 32, 33 are shown at the respective rest positions. The fact that there are three bead breaker tools 31, 32, 33 configured to operate simultaneously on the tyre allows distributing the force applied to the tyre over the entire circumference of the bead. This prevents the wheel rim and/or the tyre from being damaged by an excessively high force concentrated on a single tool.

The apparatus 1 comprises a tool-holder column 4. The tool-holder column 4 extends along a lifting axis A2, parallel to the axis of rotation A1. The apparatus 1 comprises a working unit 41, associated with the tool-holder column 4, slidable along the lifting axis A2 and rotatable about the lifting axis A2. The apparatus 1 comprises a first tool-holder assembly 42 and a second tool-holder assembly 43, which are mounted on the working unit 41. The first and the second tool-holder assembly 42, 43 extend away from the tool-holder column along respective angularly spaced directions. The apparatus 1 comprises an upper bead breaker tool 36 mounted on the first tool-holder assembly 42. The upper bead breaker tool 36 is in the form of a contoured disc having an obliquely inclined axis of rotation.

In an example embodiment, the apparatus 1 also comprises a lower operating head (or tool) 37. The lower operating head 37 is mounted on the first tool-holder assembly 42, at a height below the upper bead breaker tool 36. In effect, the upper bead breaker tool 36 is configured to interact with the top sidewall of the tyre and the lower operating head 37 is configured to interact with the bottom sidewall of the tyre. The lower operating head 37 includes one or more of the features of the lower operating head described in patent document EP2965927B1 in the name of the present Applicant. It is expressly understood that all the features of the lower operating head described in patent document EP2965927B1 are also applicable to the lower operating head 37 according to this disclosure. More specifically, the lower operating head 37 includes an additional lower bead breaker tool (in the form of a contoured disc whose axis is obliquely inclined to the axis of rotation A1); the additional bead breaker tool is configured to operate on the bottom bead of the tyre. The lower operating head 37 also includes a lower mounting tool having an elongated shape so it can be operatively inserted between the bottom bead of the tyre and a top edge of the rim, and being angularly spaced from the additional lower bead breaker tool by a predetermined angle. The lower operating head 37 is rotatable about a respective axis of rotation so the additional lower bead breaker tool and the lower mounting tool are selectively and alternatively positionable in an operating configuration in which they are directed towards the wheel through rotation of the lower operating head (relative to the first tool-holder assembly 42). The lower operating head 37 is spaced from the upper bead breaker tool 36.

The apparatus 1 comprises a lower mounting tool 35, in addition (or alternatively) to the lower operating head (or tool) 37. The lower mounting tool 35 is spaced from the demounting tool 34.

The apparatus 1 comprises an operating head for assisting with demounting 34. The operating head for assisting with demounting 34 is mounted on the second tool-holder assembly 43. The operating head for assisting with demounting 34 includes a first portion having a first end connected to the second tool-holder assembly 43 and a second end, opposite to the first end; the first portion extends in a first direction;

The operating head for assisting with demounting 34 includes a second portion which extends in a second direction different from the first; the second portion has a first end which is connected to the second end of the first portion; the operating head for assisting with demounting 34 includes a wheel which is rotatably coupled to a second end of the second portion, opposite to the first end. The operating head for assisting with demounting 34 made in this way can be used as a supporting point for the purposes of demounting.

It should be noted that in an embodiment, the operating head for assisting with demounting 34 could be replaced with the operating head described in patent document EP3069905B1 in the name of the present Applicant. It is expressly understood that all the features of the operating head of patent document EP3069905B1 are also applicable to this embodiment of the operating head according to this disclosure.

The apparatus 1 comprises a hydraulic circuit 6. The apparatus 1 comprises a plurality of hydraulic actuators 61, 62, 63; more specifically, the apparatus 1 comprises a first hydraulic actuator 61, a second hydraulic actuator 62 and a third hydraulic actuator 63. The hydraulic circuit 6 is configured to control the hydraulic actuators 61, 62, 63.

The hydraulic circuit 6 comprises a pump assembly 9, including a motor and a volumetric gear pump. The hydraulic circuit 6 also comprises a hydraulic tank 97, connected to the pump assembly 9; preferably, a filter is provided between the hydraulic tank 97 and the pump assembly. More specifically, the intake side of the pump assembly 9 is connected to the hydraulic tank 97 and the delivery side is connected to a forward-flow branch 91 of the hydraulic circuit 6. Besides the forward-flow branch 91, the hydraulic circuit 6 comprises a return branch 92 connected to the hydraulic tank 97 to deliver to the hydraulic tank 97 the fluid (or oil) that returns from the circuit. Preferably, the hydraulic circuit 6 also comprises an electrovalve 95 configured to place the forward-flow branch 91 and the return branch 92 in communication; more specifically, the electrovalve 95 is positioned in a branch which is connected, at one end, to the forward-flow branch 91 between the pump assembly 9 and the distributor 60 and, at the opposite end, to the return branch 92, between the distributor 60 and the tank 97. The electrovalve 95 is configured to open when the pressure at a certain point in the circuit reaches a maximum value. This prevents the pump 9 from being damaged if it comes into operation when the oil circuit is blocked (or open).

The hydraulic circuit 6 also comprises a distributor 60; preferably, the distributor 60 includes a 4/3 way closed-centre drawer valve. The distributor 60 is connected to the forward-flow branch 91, between the pump assembly 9 and the actuators 61, 62, 63; further, the distributor 60 is connected to the return branch 62, between the actuators 61, 62, 63 and the pump assembly 9. Preferably, the hydraulic circuit also comprises a cross check valve 79, connected to the forward-flow branch 91 between the distributor 60 and the actuators 61, 62, 63, and to the return branch 92, between the actuators 61, 62, 63 and the distributor 60. The cross check valve 79 ensures that there are no oil leaks at start-up that would cause small unwanted movements of the pistons.

The first actuator 61 includes a cylinder 61A and a piston which includes a stem 61B and a plunger 61C. The cylinder 61A delimits an internal space of the first actuator 61. The piston, specifically the plunger 61C, divides the internal space into an opening chamber and a closing chamber. Similarly, the second actuator 62 includes a cylinder 62A and a piston which includes a stem 62B and a plunger 62C. The cylinder 62A delimits an internal space of the second actuator 62. The piston, specifically the plunger 62C, divides the internal space into an opening chamber and a closing chamber. The third actuator 63 includes a cylinder 63A and a piston which includes a stem 63B and a plunger 63C. The cylinder 63A delimits an internal space of the third actuator 63. The piston, specifically the plunger 63C, divides internal space into an opening chamber and a closing chamber.

In an embodiment, the actuators 61, 62 and 63 are connected to each other in series in a "master-slave" configuration. In this embodiment, the first actuator 61 is driven directly by the pump assembly 9, the second actuator 62 is driven by the first actuator 61 and the third actuator 63 is driven by the second actuator 62. Thus, the first actuator 61 acts as "master" actuator and the second and third actuators 62, 63 act as "slaves".

The opening chamber 61A of the first actuator receives the fluid (oil) from the pump assembly 9 through the forward-flow branch 91. The flow of fluid into the opening chamber of the first actuator 61 makes the piston move upwards (with reference to the accompanying drawings) and pressurizes the fluid in the closing chamber of the first actuator 61. The closing chamber of the first actuator 61 is connected to the opening chamber of the second actuator 62 through a first connecting branch 64; thus, pressurizing the fluid in the closing chamber of the first actuator 61 causes a flow of pressurized fluid from the closing chamber of the first actuator 61 to the opening chamber of the second actuator 62. The flow of fluid into the opening chamber of the second actuator 62 makes the piston move upwards (with reference to the accompanying drawings) and pressurizes the fluid in the closing chamber of the second actuator 62 The closing chamber of the second actuator 62 is connected to the opening chamber of the third actuator 63 through a second connecting branch 65; thus, pressurizing the fluid in the closing chamber of the second actuator 62 causes a flow of pressurized fluid from the closing chamber of the second actuator 62 to the opening chamber of the third actuator 63. The flow of fluid into the opening chamber of the third actuator 63 makes the piston move upwards (with reference to the accompanying drawings) and pressurizes the fluid in the closing chamber of the third actuator 63. The closing chamber of the third actuator 63 is connected to the return branch 92; thus, the fluid flowing out of the closing chamber of the third actuator 63 returns to the pump assembly 9.

It should be noted that the stem 61B is located in the closing chamber of the first actuator 61. Similarly, the stem 62B is located in the closing chamber of the second actuator 62. The stem 63B is located in the closing chamber of the third actuator 63. Thus, to enable the fluid in the closing chamber of the first actuator 61 to effectively pressurize the opening chamber of the second actuator 62, the cylinder 61A of the first actuator 61 is larger in diameter than the cylinder 62A of the second actuator 62. Similarly, to enable the fluid in the closing chamber of the second actuator 62 to effectively pressurize the opening chamber of the third actuator 63, the cylinder 62A of the second actuator 62 is larger in diameter than the cylinder 63A of the third actuator 63. For example, the cylinder 61A might be between 40 and 50 cm in diameter, the cylinder 62A might be between 35 and 45 cm in diameter and the cylinder 63A might be between 20 and 30 cm in diameter. Further, for reasons of proportionality, the stem 61B of the first actuator 61 might be larger in diameter than the stem 62B of the second actuator; the stem 62B of the second actuator 62 is greater than or equal in diameter to the stem 63B of the third actuator 63. For example, the stem 61B of the first actuator 61 may be around 22 cm in diameter and the stems 62B and 63B may be around 20 cm in diameter.

The hydraulic circuit 6 also comprises a rephasing (or realignment) system, configured to keep the actuators 61, 62, 63 aligned—that is, in phase—with each other. The rephasing circuit comprises a first realignment (or rephasing) branch 76, a second realignment (or rephasing) branch 77 and a third realignment (or rephasing) branch 78. The first realignment branch 76 interconnects the forward-flow branch 91, downstream of the distributor 60 and upstream of the first actuator 61, with a first node which is in communication both with the opening chamber of the second cylinder 62 (as well as with the first connecting branch 64) and with the second realignment branch 77. The second realignment branch 77 is interconnected with the first node, which is in communication both with the opening chamber of the second cylinder 62 (as well as with the first connecting branch 64) and with the first realignment branch 76, and a second node, which is in communication both with the opening chamber of the third actuator 63 (as well as with the second connecting branch 65) and with the third realignment branch 78. The third realignment branch 78 is interconnected with the second node, which is in communication both with the opening chamber of the third actuator 63 (as well as with the second connecting branch 65) and with the second realignment branch 77, as well as with the return branch 92 downstream of the third actuator 63 and upstream of the distributor 60.

The hydraulic circuit 6 comprises a first electrovalve 66, located in the first realignment branch 76. The hydraulic circuit 6 also comprises a first calibrated throttle 69, located in the first realignment branch 76, between the first electrovalve 66 and the node which connects to the second realignment branch 77 and to the opening chamber of the second actuator 62. The hydraulic circuit 6 comprises a second electrovalve 67, located in the second realignment branch 77. The hydraulic circuit 6 also comprises a second calibrated throttle 70, located in the second realignment branch 77, between the second electrovalve 67 and the node which connects to the third realignment branch 78 and to the opening chamber of the third actuator 64. The hydraulic circuit 6 comprises a third electrovalve 68, located in the third realignment branch 78. The hydraulic circuit 6 also comprises a third calibrated throttle 71, located in the third realignment branch 78, between the third electrovalve 68 and the node which connects to the return branch 92. The apparatus 1 includes a control unit configured to open first, second and third electrovalves 66, 67, 68 simultaneously; preferably, the control unit commands the first, second and third electrovalves 66, 67, 68 to open each time the pistons of the actuators 61, 62, 63 reach the bottom dead centre: that is to say, when the plunger 61C, 62C, 63C is at its minimum height and the opening chamber is at its minimum volume. In effect, it is noted that the pistons of the actuators 61, 62, 63 move vertically, the plungers 61C, 62C, 63C are oriented horizontally and the opening chamber is positioned under the closing chamber. When the electrovalves 66, 67, 68 are open, the actuators 61, 62, 63 are connected in parallel (for a limited length of time—that is, for the aforesaid predetermined length of time): in effect, the fluid flows through the realignment branches 76, 77 and 78 which connect the opening chambers of the actuators 61, 62, 63 to each other. In effect, the actuators 61, 62, 63 are preferably located at the same vertical height. By the effect of the throttles 69, 70, 71, the pressure in the opening chambers of the actuators remains different; more specifically, the pressure of the opening chamber of the first actuator 61 is greater than the pressure of the opening chamber of the second actuator 62, which is in turn greater than the pressure of the opening chamber of the third actuator 63. Thus, by the effect of the calibrated throttles 69, 70, 71, the fluid in the opening chamber of each actuator 61, 62, 63 differs in pressure from that in the other opening chambers by a predetermined pressure difference. The throttles 69, 70 and 71 are calibrated in size to ensure the pistons move in the same direction.

It should be noted that each calibrated throttle 69, 70, 71 is configured to determine a load loss in the realignment branch. Preferably, the load losses caused by the calibrated throttles 69, 70, 71 differ from each other. More specifically, the load loss caused by the first calibrated throttle 69 is smaller than the load loss caused by the second calibrated throttle 70; the load loss caused by the second calibrated throttle 70 is smaller than the load loss caused by the third calibrated throttle 71.

The hydraulic circuit 6 may also include a first pressure switch 72 and a second pressure switch 73, both connected to the first realignment branch 76 so that the first electrovalve 76 and the first calibrated throttle 69 are interposed between the first pressure switch 72 and the second pressure switch 73. The hydraulic circuit 6 may include a third pressure switch 74 connected to the second realignment branch 77 so that the second electrovalve 67 and the second calibrated throttle 74 are interposed between the second pressure switch 73 and the third pressure switch 74. The hydraulic circuit 6 may include a fourth pressure switch 75 connected to the third realignment branch 78 or to the return branch 92 so that the third electrovalve 68 and the second calibrated throttle 71 are interposed between the third pressure switch 74 and the fourth pressure switch 75. It is noted that the pressure switches 72, 73, 74, 75 might be replaced by connector fittings to which a pressure gauge may be connected.

Preferably, in the step of feeding the fluid to the opening chamber of the first actuator 61, the pressure of the fluid in the forward-flow branch 91 and in the opening chamber of the first actuator 61 is between 100 and 120 bar. On account of the first calibrated throttle 69, the pressure difference between the first and the second pressure switch 72, 73 may be 20 bar; on account of the second calibrated throttle 70, the pressure difference between the second and the third pressure switch 73, 74 may be 35 bar; on account of the third calibrated throttle 71, the pressure difference between the third and the fourth pressure switch 74, 75 may be 52 bar.

In another embodiment, the actuators 61, 62 and 63 are connected to each other in parallel. In this embodiment, the forward-flow branch 91 is connected to the opening chambers of the actuator 61, 62, 63 and the return branch is connected to the closing chambers of the actuator 61, 62, 63. Provided in this case, too, are the distributor 60, which preferably includes a drawer valve, and the cross check valve 79. In this case, too, the hydraulic circuit 6 includes a rephasing system, comprising a branch; the branch is positioned between the cylinder and the distributor/flow divider; in an example, the branch includes a first realignment branch 76, the opening chambers of the first and second actuators 61, 62, and a second realignment branch 77, which interconnects the opening chambers of the second and the third actuator 62, 63. The rephasing system also comprises a first electrovalve 66, connected to the first realignment branch 76, and a second electrovalve 67, connected to the second realignment branch 77. The control unit in this case, too, is configured to open the electrovalves 66 and 67 when the pistons are at bottom dead centre. Since no calibrated throttles are provided in this case, the opening of the electrovalves 66 and 67 sets the same pressure in the opening chambers of the actuators 61, 62, 63.

Also, in this case, the hydraulic circuit 6 comprises a flow divider 8. The flow divider 8 is a hydraulic component that includes a plurality of volumetric gear pumps; more specifically, the flow divider 8 includes a first, a second and a third volumetric gear pump 81, 82, 83. The pumps 81, 82, 83 are mechanically interconnected, with pressure compensator to keep the cylinders of the actuators 61, 62, 63 at the same pressure, independently of the resistance load on them. That way, the cylinders rise aligned with each other irrespective of the imbalance of the external resistance load. The rephasing system serves to level any pressure differences between the cylinders produced, for example, by tolerances or leaks.

The embodiment in which the actuators 61, 62, 63 are connected in parallel has the advantage, over the embodiment in which the actuators 61, 62, 63 are connected in series, that the actuators may be identical to each other and, more generally speaking, that the hydraulic circuit 6 is simpler; it has the disadvantage of higher costs, however, on account of the flow divider 8 and because the flow divider 8 requires a pump assembly 9 with a larger cylinder capacity.

The apparatus 1 comprises a communication interface (for example, a pushbutton panel and/or one or more joysticks) 51 with which an operator can operate the tool actuators. More specifically, through the communication interface 51, the operator can drive the actuators 61, 62, 63 to raise the lower bead breaker tools 31, 32, 33 from the rest position to the working position.

The paragraphs listed below, labelled with alphanumeric references, are non-limiting example modes of describing this invention.

A. An apparatus (1) for mounting and demounting a tyre relative to a corresponding wheel rim, where the apparatus (1) comprises:

a wheel-holder unit (2), configured to receive and lock the wheel at an operating position and to set it in rotation about an axis of rotation (A1);

a plurality of tools (31, 32, 33, 34, 35, 36, 37), configured to interact with the tyre to mount and/or demount the tyre, wherein the plurality of tools comprises a plurality of bead breakers (31, 32, 33) configured to operate simultaneously, or synchronously, on the same tyre bead.

A1. The apparatus (1) according to paragraph A, wherein the axis of rotation (A1) is parallel to the weight force so that, at the operating position, the wheel tyre has a first bead positioned at a first vertical height and a second bead positioned at a second vertical height, lower than the first vertical height, and wherein the tools (for example, bead breakers; to which reference is made hereinafter for simplicity, it being understood, however, that this term shall also include tools other than bead breakers) of the plurality of bead breakers (31, 32, 33) are configured to operate simultaneously, or synchronously, on the second bead of the tyre.

A2. The apparatus according to paragraph A or A1, wherein the bead breakers of the plurality of bead breaker (31, 32, 33) are disposed around the wheel-holder unit (2).

A2.1. The apparatus according to paragraph A2, wherein the bead breakers of the plurality of bead breaker (31, 32, 33) are angularly spaced around the wheel-holder unit (2).

A2.1.1. The apparatus according to paragraph A2.1, wherein the plurality of bead breakers (31, 32, 33) includes three bead breakers angularly spaced by 120° from each other.

A3. The apparatus according to any one of paragraphs from A to A2.1.1, comprising:

a hydraulic circuit (6) comprising a pump (9);

a plurality of hydraulic actuators (61, 62, 63), connected to the hydraulic circuit (6), wherein each actuator of the plurality of actuators (61, 62, 63) defines an internal space and includes a piston which is slidable inside the internal space, wherein the piston divides the internal space into an opening chamber and a closing chamber, wherein each actuator of the plurality of actuators (61, 62, 63) is configured to drive a respective lower bead breaker (tool) (31, 32, 33) of the plurality of lower bead breaker (tools).

A3.1. The apparatus according to paragraph A3, wherein the hydraulic circuit (6) is configured to drive the actuators of the plurality of actuators (61, 62, 63) synchronously.

A3.1.1. The apparatus according to paragraph A3.1, wherein the hydraulic circuit (6) comprises a rephasing system, configured to automatically realign the actuators of the plurality of actuators (61, 62, 63), wherein the rephasing system comprises an electronic card and one or more electrovalves (66, 67, 68) positioned in respective one or more realignment branches (76, 77, 78) of the hydraulic circuit (6), wherein the electronic card is programmed to open the one or more electrovalves (66, 67, 68), responsive to a predetermined event, to establish additional fluid communication between the actuators of the plurality of actuators (61, 62, 63).

A3.1.1.1. The apparatus according to paragraph A3.1.1, wherein in each actuator of the plurality of actuators (61, 62, 63) the piston is slidable in the internal space between a top dead centre and a bottom dead centre, wherein at the top dead centre, the opening chamber has its maximum size and the closing chamber has its minimum size and, at the bottom dead centre, the opening chamber has its minimum size and the closing chamber has its maximum size, wherein the rephasing system comprises a sensor associated with the plurality of actuators (61, 62, 63), wherein the sensor is configured to send a position signal to the electronic card, responsive to detecting the piston at the bottom dead centre (or at a predetermined distance therefrom), wherein the electronic card is configured to open the one or more electrovalves (66, 67, 68), responsive to receiving the position signal from the sensor.

A3.1.1.1.1. The apparatus according to paragraph A3.1.1.1, wherein the electronic card includes a timer, configured to count a predetermined length of time, wherein the control unit is configured to reclose the one or more electrovalves (66, 67, 68) when the predetermined length of time has elapsed.

A3.1.1.1.1.1. The apparatus according to paragraph A3.1.1.1.1, wherein the predetermined length of time is between 2 and 4 seconds.

A3.1.2. The apparatus according to any one of paragraphs from A3.1 to A3.1.1.1.1.1, wherein the plurality of actuators (61, 62, 63) includes a first actuator (61) and a second actuator (62), wherein the opening chamber of the first actuator (61) is operatively connected to the pump (9) to receive and/or deliver fluid from/to the pump (9) and the opening chamber of the second actuator (62) is connected to the closing chamber of the first actuator (61) to receive and/or deliver fluid from/to the first actuator (61).

A3.1.2.1. The apparatus according to paragraph A3.1.2, wherein for each first actuator (61) and second actuator (62), the piston includes a stem (61B, 62B) and a plunger (61C, 62C), wherein the cylinder (61A) of the first actuator (61) is larger in diameter than the cylinder (62A) of the second actuator (62).

A3.1.2.1.1. The apparatus according to paragraph A3.1.2.1, wherein the stem (61B) of the first actuator (61) is larger in cross section than the stem (62B) of the second actuator (62).

A3.1.2.2. The apparatus according to any one of paragraphs from A3.1.2 to A3.1.2.1.1, wherein the plurality of actuators (61, 62, 63) includes a third actuator (63), the opening chamber of the third actuator (63) being connected to the closing chamber of the second actuator (62) to receive and/or deliver fluid from/to the second actuator (62).

A3.1.2.3. The apparatus according to any one of paragraphs from A3.1.2 to A3.1.2.2, wherein the hydraulic circuit (6) comprises a rephasing system, configured to automatically realign the actuators of the plurality of actuators (61, 62, 63), wherein the rephasing system comprises an electronic card and a number of electrovalves (66, 67, 68) equal to the number of actuators (61, 62, 63) of the plurality of actuators (61, 62, 63).

A3.1.2.3.1. The apparatus according to paragraph A3.1.2.3, wherein the rephasing system also includes, for each electrovalve (66, 67, 68), a calibrated throttle (69, 70, 71), located in the respective realignment branch (76, 77, 78).

A3.1.2.4. The apparatus according to any one of paragraphs from A3.1.2 to A3.1.2.3, wherein at least one realignment branch (76, 77) interconnects the opening chambers of one pair of actuators of the plurality of actuators (61, 62, 63).

A3.1.3. The apparatus according to any one of paragraphs from A3.1 to A3.1.2.4, wherein the pump (9) has a delivery section that is connected to the opening chambers of the actuators of the plurality of actuators (61, 62, 63) and a return section that is connected to the closing chambers of the actuators of the plurality of actuators (61, 62, 63).

A3.1.3.1. The apparatus according to paragraph A3.1.3, comprising a flow dividing device (8) located between the delivery section of the pump (9) and the opening chambers of the actuators of the plurality of actuators (61, 62, 63).

A3.1.3.1.1. The apparatus according to paragraph A3.1.3.1, wherein the flow dividing device (8) comprises a plurality of volumetric gear pumps (81, 82, 83) that are mechanically interconnected.

A3.1.3.1.1.1. The apparatus according to paragraph A3.1.3.1.1, wherein the flow dividing device (8) comprises a number of volumetric gear pumps (81, 82, 83) equal to the number of actuators of the plurality of actuators (61, 62, 63), wherein each volumetric gear pump (81, 82, 83) is configured to feed the fluid to a respective actuator of the plurality of actuators (61, 62, 63).

A3.1.3.1.1.1.1. The apparatus according to paragraph A3.1.3.1.1.1, wherein the flow dividing device (8) comprises a pressure compensator to keep the same pressure in the cylinders of the actuators of the plurality of actuators (61, 62, 63), independently of the resistance load on them.

A3.1.3.2. The apparatus according to any one of paragraphs from A3.1.1 to A3.1.3.1.1.1.1, wherein the rephasing circuit (6) comprises a number of electrovalves (66, 67, 68) which is one less than the number of actuators (61, 62, 63) and each electrovalve (66, 67, 68) is located in a respective realignment branch (76, 77) which connects the opening chambers of a pair of hydraulic actuators (61, 62).

A3.2. The apparatus according to any one of paragraphs from A3.1.2 to A3.1.2.1.1.1.1, wherein the hydraulic circuit (6) comprises a pump assembly, including the pump (9), a motor to drive the pump (9) and a tank for the fluid, and a distributor, configured to control the oil flow.

A3.2.1. The apparatus according to paragraph A3.2, wherein the distributor comprises a directional valve (60) and a check valve (79).

A3.2.1.1. The apparatus according to paragraph A3.2.1, wherein the directional valve (60) is a 4/3 drawer valve and the check valve (79) is a cross valve.

A4. The apparatus according to any one of paragraphs from A to A3.2.1.1, comprising, for each bead breaker (31, 32, 33), a respective supporting arm which the bead breaker (31, 32, 33) is mounted on, the supporting arm being movable, by the effect of the respective actuator (61, 62, 63), between a retracted position and an extracted position.

A4.1. The apparatus according to paragraph A4, wherein the support arm is movable along a vertical direction, parallel to the weight force.

B. An apparatus (1) for mounting and demounting a tyre relative to a corresponding wheel rim, wherein the apparatus (1) comprises:

a wheel-holder unit (2), configured to receive and lock the wheel at an operating position and to set it in rotation about an axis of rotation (A1);

a plurality of tools (31, 32, 33, 34, 35, 36, 37), configured to interact with the tyre to mount and/or demount the tyre, wherein the wheel-holder unit (2) comprises:

a rotary rod (21), rotatable about the axis of rotation (A1) and having a hole at the top of it;

a locking device (26) having a lower end and an upper end, where the hole at the top of the rotary rod (21) is adapted to receive the lower end of the locking device (26), to lock the rim at a position between the top of the rod and the upper end of the locking device (26);

a plurality of turrets (22, 23, 24, 25), disposed around the rotary rod (21) and rotating about the axis of rotation (A1) as one with the rotary rod (21).

B1. The apparatus according to paragraph B, wherein the axis of rotation (A1) is parallel to the weight force.

B2. The apparatus according to paragraph B or B1, wherein the turrets of the plurality of turrets (22, 23, 24, 25) are equidistant from the axis of rotation (A1).

B3. The apparatus according to any one of paragraphs from B to B2, wherein the turrets are in the form of cylinders, preferably made of plastic.

B4. The apparatus according to any one of paragraphs from B to B3, wherein the turrets (22, 23, 24, 25) of the plurality of turrets (22, 23, 24, 25) are movable radially relative to the axis of rotation (A1) between a plurality of operating positions.

B4.1. The apparatus according to paragraph B4, wherein the plurality of turrets (22, 23, 24, 25) are movable radially in coordinated fashion.

B5. The apparatus according to any one of paragraphs from B to B4.1, wherein the wheel-holder unit includes a plate (27) oriented perpendicularly to the axis of rotation (A1) and connected to a rotary shaft to rotate about the axis of rotation (A1), wherein the rotary shaft (21) and the turrets (22, 23, 24, 25) of the plurality of turrets (22, 23, 24, 25) are supported by the plate (27).

B5.1. The apparatus according to paragraph B5, wherein the plurality of tools (31, 32, 33, 34, 35, 36, 37) includes a plurality of lower bead breakers (31, 32, 33) configured to interact with a bottom sidewall of the tyre and controlled by respective actuators of the plurality of actuators (61, 62, 63) to move between a rest position, where they are located at a vertical height below the plate (27), and a working position, where they are located at a vertical height above the plate (27), to interact with the tyre.

B6. The apparatus according to any one of paragraphs from B to B5.1, in combination with any one of paragraphs from A to A4.1.

C. An apparatus (1) for mounting and demounting a tyre relative to a corresponding wheel rim, wherein the apparatus (1) comprises:

a wheel-holder unit (2), configured to receive and lock the wheel at an operating position and to set it in rotation about an axis of rotation (A1);

a tool-holder column (4) oriented in parallel with the weight force;

a working unit (41) which is slidably coupled to the column (4) to move along a lifting axis (A2), parallel to the weight force and to rotate around the tool-holder column (4);

a first and a second tool-holder assembly (42, 43), connected to the working unit (41) and extending away from the tool-holder column (4) along respective angularly spaced directions, a plurality of tools (31, 32, 33, 34, 35, 36, 37), configured to interact with the tyre to mount and/or demount the tyre, wherein the plurality of tools comprises at least a first tool mounted on the first tool-holder assembly and a second tool mounted on the second tool-holder assembly.

C1. The apparatus (1) according to paragraph C, comprising a rotary sleeve, rotatably coupled to the tool-holder column (4) to rotate around it, about the lifting axis (A2), wherein the working unit (41) is slidably coupled to an outside surface of the sleeve to move by translation relative to the sleeve along the lifting axis (A2).

C1.1. The apparatus (1) according to paragraph C.1, comprising a lifting actuator configured to move the working unit relative to the sleeve along the lifting axis (A2), the lifting actuator being preferably a hydraulic actuator.

C1.1.1. The apparatus (1) according to paragraph C.1.1, comprising a control unit connected to the lifting actuator and configured to command the lifting actuator to move the working unit along the lifting axis (A2).

C1.1.1.1. The apparatus (1) according to paragraph C.1.1.1, comprising a selector switch configured to select a position of the working unit from a plurality of predetermined positions.

C2. The apparatus (1) according to any one of paragraphs from C to C1.1.1.1, wherein the first tool-holder assembly supports a mounting tool and a demounting tool (34), vertically spaced from each other, and/or the second tool-holder assembly supports a pair of bead breaker discs, vertically spaced from each other.

C2.1. The apparatus (1) according to paragraph C2, wherein the operating head for assisting with demounting (that is, the demounting tool (34)) includes a first portion extending in a first direction, a second portion extending in a second direction, different from the first, and having a first end connected to the first portion, and a wheel which is rotatably coupled to a second end of the second portion, opposite to the first end.

C2.2. The apparatus (1) according to paragraph C2 or paragraph C2.1, including a lower operating head, provided with at least one additional lower bead breaker tool configured to operate on a bottom tyre bead, and with a lower mounting tool, having an elongated shape so it can be operatively inserted between a bottom bead of the tyre and a top edge of the rim, and being angularly spaced from the additional lower bead breaker tool by a predetermined angle, wherein the lower operating head is rotatable about a respective axis of rotation so the additional lower bead breaker tool and the lower mounting tool are selectively and alternatively positionable in an operating configuration in which they are directed towards the wheel through rotation of the lower operating head.

C3. The apparatus according to any one of paragraphs from C to C2.2, wherein the wheel-holder unit (2) includes a plate (27), oriented perpendicularly to the axis of rotation (A1) and connected to a rotary shaft to rotate about the axis of rotation (A1), wherein the plurality of tools (31, 32, 33, 34, 35, 36, 37) includes a plurality of lower bead breakers (31, 32, 33), disposed around the wheel-holder unit (2) and configured to interact with a bottom sidewall of the tyre and controlled by respective actuators (61, 62, 63) to move between a rest position, where they are located at a vertical height below the plate (27), and a working position, where they are located at a vertical height above the plate (27), to interact with the tyre.

C4. The apparatus according to any one of paragraphs from C to C3, in combination with any one of paragraphs from A to A4.1.

C5. The apparatus according to any one of paragraphs from C to C3, in combination with any one of paragraphs from B to B5.1.

D. An apparatus (1) for mounting and demounting a tyre relative to a corresponding wheel rim, wherein the apparatus (1) comprises:

a wheel-holder unit (2), configured to receive and lock the wheel at an operating position and to set it in rotation about an axis of rotation (A1);

a plurality of tools (31, 32, 33, 34, 35, 36, 37), configured to interact with the tyre to mount and/or demount the tyre;

a hydraulic circuit (6) comprising a pump (9);

a plurality of hydraulic actuators (61, 62, 63), connected to the hydraulic circuit (6), wherein each actuator of the plurality of actuators (61, 62, 63) defines an internal space and includes a piston which is slidable inside the internal space, wherein the piston divides the internal space into an opening chamber and a closing chamber, wherein the hydraulic circuit (6) is configured to drive the actuators of the plurality of actuators (61, 62, 63) synchronously.

D1. The apparatus according to paragraph D, wherein the hydraulic circuit (6) comprises a rephasing system, configured to automatically realign the actuators of the plurality of actuators (61, 62, 63), wherein the rephasing system comprises an electronic card and one or more electrovalves (66, 67, 68) positioned in respective one or more realignment branches (76, 77, 78) of the hydraulic circuit (6), wherein the electronic card is programmed to open the one or more electrovalves (66, 67, 68), responsive to a predetermined event, to establish additional fluid communication between the actuators of the plurality of actuators (61, 62, 63).

D1.1. The apparatus according to paragraph D1, wherein in each actuator of the plurality of actuators (61, 62, 63) the piston is slidable in the internal space between a top dead centre and a bottom dead centre, wherein at the top dead centre, the opening chamber has its maximum size and the closing chamber has its minimum size and, at the bottom dead centre, the opening chamber has its minimum size and the closing chamber has its maximum size, wherein the rephasing system comprises a sensor associated with the plurality of actuators (61, 62, 63), wherein the sensor is configured to send a position signal to the electronic card, responsive to detecting the piston at the bottom dead centre (or at a predetermined distance therefrom), wherein the electronic card is configured to open the one or more electrovalves (66, 67, 68), responsive to receiving the position signal from the sensor.

D1.1.1. The apparatus according to paragraph D1.1, wherein the electronic card includes a timer, configured to count a predetermined length of time, wherein the control unit is configured to reclose the one or more electrovalves (66, 67, 68) when the predetermined length of time has elapsed, the predetermined length of time being preferably between 2 and 4 seconds or between 1 and 5 seconds.

D2. The apparatus according to any one of paragraphs from D1 to D1.1.1, wherein the rephasing system also includes, for each electrovalve (66, 67, 68), a calibrated throttle (69, 70, 71), located in the respective realignment branch (76, 77, 78).

D2.1. The apparatus according to any one of paragraphs from D to D2, wherein at least one realignment branch (76, 77) interconnects the opening chambers of one pair of actuators of the plurality of actuators (61, 62, 63).

D2.2. The apparatus according to any one of paragraphs from D to D2.1, wherein the plurality of actuators (61, 62, 63) includes a first actuator (61) and a second actuator (62), wherein the opening chamber of the first actuator (61) is operatively connected to the pump (9) to receive and/or deliver fluid from/to the pump (9) and the opening chamber of the second actuator (62) is connected to the closing chamber of the first actuator (61) to receive and/or deliver fluid from/to the first actuator (61).

D2.2.1. The apparatus according to paragraph D2.2, wherein for each first actuator (61) and second actuator (62), the piston includes a stem (61B, 62B) and a plunger (61C, 62C), wherein the cylinder (61A) of the first actuator (61) is larger in diameter than the cylinder (62A) of the second actuator (62), and/or the stem (61B) of the first actuator (61) is larger in cross section than the stem (62B) of the second actuator (62).

D3. The apparatus according to any one of paragraphs from D to D1.1.1, wherein the pump (9) has a delivery section that is connected to the opening chambers of the actuators of the plurality of actuators (61, 62, 63) and a return section that is connected to the closing chambers of the actuators of the plurality of actuators (61, 62, 63).

D3.1. The apparatus according to paragraph D3, comprising a flow dividing device (8) located between the delivery section of the pump (9) and the opening chambers of the actuators of the plurality of actuators (61, 62, 63).

D3.1.1. The apparatus according to paragraph D3.1, wherein the flow dividing device (8) comprises a plurality of volumetric gear pumps (81, 82, 83) that are mechanically interconnected.

D3.1.1.1. The apparatus according to paragraph D3.1.1, wherein the flow dividing device (8) comprises a number of volumetric gear pumps (81, 82, 83) equal to the number of actuators of the plurality of actuators (61, 62, 63), wherein each volumetric gear pump (81, 82, 83) is configured to feed the fluid to a respective actuator of the plurality of actuators (61, 62, 63).

D3.1.1.1.1. The apparatus according to paragraph D3.1.1.1, wherein the flow dividing device (8) comprises a pressure compensator to keep the same pressure in the cylinders of the actuators of the plurality of actuators (61, 62, 63), independently of the resistance load on them.

D3.2. The apparatus according to any one of paragraphs from D3 to D3.1.1.1.1, wherein the rephasing circuit (6) comprises a number of electrovalves (66, 67, 68) which is one less than the number of actuators (61, 62, 63) and each electrovalve (66, 67, 68) is located in a respective realignment branch (76, 77) which connects the opening chambers of a pair of hydraulic actuators (61, 62).

D4. The apparatus according to any one of paragraphs from D to D2.2, wherein the plurality of actuators comprises a first actuator (61) associated with the wheel-holder unit (2) to move it along the axis of rotation (A1) and a second actuator (62) associated with a tool of the plurality of tools (31, 32, 33, 34, 35, 36, 37) to move it towards and away from the wheel-holder unit (2), along a horizontal direction parallel to the axis of rotation (A1).

D4.1. The apparatus according to paragraph D4, wherein the axis of rotation (A1) of the wheel-holder unit (2) is perpendicular to the weight force.

D5. The apparatus according to any one of paragraphs from D to D4.1, wherein the plurality of tools comprises a plurality of bead breakers configured to operate simultaneously on the same bead of the tyre.

D6. The apparatus according to any one of paragraphs from D to D5, in combination with any one of paragraphs from A to A4.1.

D7. The apparatus according to any one of paragraphs from D to D6, in combination with any one of paragraphs from B to B5.1.

D8. The apparatus according to any one of paragraphs from D to D7, in combination with any one of paragraphs from C to C3.

E. A method for demounting and/or mounting a tyre relative to a respective wheel rim, comprising the following steps:
    receiving and locking the wheel to a wheel-holder unit (2);
    rotating the wheel about an axis of rotation (A1) by means of the wheel-holder unit (2);
    moving a plurality of tools (31, 32, 33, 34, 35, 36, 37), wherein the plurality of tools comprises a plurality of bead breakers (31, 32, 33) which, in the step of moving, are moved so they operate simultaneously, or synchronously, on the same bead of the tyre.

E1. The method according to paragraph E, wherein the apparatus has one or more of the features of the apparatus of paragraphs A1 to A4.1.

F. A method for demounting and/or mounting a tyre relative to a respective wheel rim, comprising the following steps:
    receiving and locking the wheel to a wheel-holder unit (2);
    rotating the wheel about an axis of rotation (A1) by means of the wheel-holder unit (2);
    moving a plurality of tools (31, 32, 33, 34, 35, 36, 37) which interact with the tyre to mount and/or demount the tyre,
    wherein the wheel is locked in place by a locking device (26) having a lower end and an upper end which acts in conjunction with a rotary rod (21) rotatable about the axis of rotation (A1) and having a hole at the top of it, wherein the hole at the top of the rotary rod (21) receives the lower end of the locking device (26), to lock the rim at a position between the top of the rod and the upper end of the locking device (26);
    wherein the wheel-holder unit also comprises a plurality of turrets (22, 23, 24, 25) disposed around the rotary rod (21) and rotating about the axis of rotation (A1) as one with the rotary rod (21), wherein the turrets (22, 23, 24, 25) of the plurality of turrets (22, 23, 24, 25) have respective ends (for example, upper or lateral ends) which abut corresponding rim portions positioned around a central hole of the rim when the rim is received by the wheel-holder unit (2).

F1. The method according to paragraph F, wherein the apparatus has one or more of the features of the apparatus from B1 to B6 and/or the method has one or more of the features of paragraphs E.

G. A method for demounting and/or mounting a tyre relative to a respective wheel rim, comprising the following steps:
    receiving and locking the wheel to a wheel-holder unit (2);
    rotating the wheel about an axis of rotation (A1) by means of the wheel-holder unit (2);
    moving a plurality of tools (31, 32, 33, 34, 35, 36, 37) that interact with the tyre to demount and/or mount the tyre, wherein the plurality of tools comprises at least a first tool mounted on a first tool-holder assembly and a second tool mounted on a second tool-holder assembly, both connected to the working unit (41) and extending away from the tool-holder column (4) along respective angularly spaced directions.

G1. The method according to paragraph G, wherein the apparatus has one or more of the features of the apparatus from C1 to C5 and/or the method has one or more of the features of the method of paragraphs E and/or F.

H. A method for demounting and/or mounting a tyre relative to a respective wheel rim, comprising the following steps:
    receiving and locking the wheel to a wheel-holder unit (2);
    rotating the wheel about an axis of rotation (A1) by means of the wheel-holder unit (2);
    moving a plurality of tools (31, 32, 33, 34, 35, 36, 37) which interact with the tyre to mount and/or demount the tyre;
    synchronously driving a plurality of hydraulic actuators (61, 62, 63) by means of a hydraulic circuit (6) comprising a pump (9) and connected to the actuators of the plurality of actuators (61, 62, 63).

H1. The method according to paragraph H, in combination with one or more of the features of the apparatus from C1 to C5 or of the method of paragraphs E and/or F and/or G.

The invention claimed is:

1. An apparatus for mounting and demounting a tyre relative to a corresponding wheel rim, wherein the apparatus comprises:
    a wheel-holder unit, configured to receive and lock the wheel at an operating position and to set the wheel in rotation about an axis of rotation;
    a plurality of tools, configured to interact with the tyre to mount and/or demount the tyre;
    a hydraulic circuit comprising a pump;
    a plurality of hydraulic actuators, connected to the hydraulic circuit, wherein each actuator of the plurality of actuators defines an internal space and includes a piston which is slidable inside the internal space, wherein the piston divides the internal space into an opening chamber and a closing chamber,
    wherein the hydraulic circuit is configured to drive the actuators of the plurality of actuators synchronously,
        wherein the hydraulic circuit comprises a rephasing system, configured to automatically realign the actuators of the plurality of actuators, wherein the rephasing system comprises an electronic card and one or more electrovalves positioned in respective one or more realignment branches of the hydraulic circuit, wherein the electronic card is programmed to open the one or more electrovalves, responsive to a predetermined event, to establish additional fluid communication between the actuators of the plurality of actuators, wherein the rephasing system includes a number of electrovalves which is equal to the number of actuators of the plurality of actuators and also includes, for each electrovalve, a calibrated throttle located in the respective realignment branch.

2. The apparatus according to claim 1, wherein the plurality of actuators includes a first actuator and a second actuator, wherein the opening chamber of the first actuator is operatively connected to the pump to exchange fluid with the pump and the opening chamber of the second actuator is connected to the closing chamber of the first actuator to exchange fluid with the first actuator.

3. The apparatus according claim 2, wherein each first actuator and second actuator includes a respective cylinder defining the internal space, and wherein the piston includes a stem and a plunger, wherein the cylinder of the first actuator is larger in diameter than the cylinder of the second actuator.

4. The apparatus according to claim 1, wherein in each actuator of the plurality of actuators the piston is slidable in the internal space between a top dead centre and a bottom dead centre, wherein at the top dead centre, the opening chamber has its maximum size and the closing chamber has its minimum size and, at the bottom dead centre, the opening chamber has its minimum size and the closing chamber has its maximum size, wherein the rephasing system comprises a sensor associated with the plurality of actuators, wherein the sensor is configured to send a position signal to the electronic card, responsive to detecting the piston at a predetermined position, wherein, at the predetermined position, the piston is at a predetermined distance from the bottom dead centre, wherein the electronic card is configured to open the one or more electrovalves, responsive to receiving the position signal from the sensor.

5. The apparatus according to claim 4, wherein the electronic card includes a timer, configured to count a predetermined length of time, wherein the control unit is configured to reclose the one or more electrovalves when the predetermined length of time has elapsed.

6. The apparatus according to claim 1, wherein at least one realignment branch interconnects the opening chambers of one pair of actuators of the plurality of actuators.

7. The apparatus according to claim 1, wherein the plurality of tools includes a plurality of lower bead breakers, movable by the effect of the plurality of actuators between a rest position, where they are away from the tyre of the wheel positioned at the operating position, and a working position, where they interact with a bottom sidewall of the wheel tyre, wherein, at the working position, the bead breakers of the plurality of lower bead breakers are at a first vertical height and, at the rest position, the bead breakers of the plurality of lower bead breakers are at a second vertical height, lower than the first vertical height.

8. The apparatus according to claim 7, wherein the bead breakers of the plurality of bead breakers are disposed around the wheel-holder unit, angularly equispaced from each other.

9. The apparatus according to claim 8, wherein the plurality of bead breakers includes three bead breakers angularly spaced by 120° from each other.

10. The apparatus according to claim 7, wherein the axis of rotation is parallel to the weight force so that, at the operating position, the wheel tyre has a first bead positioned at a first vertical height and a second bead positioned at a second vertical height, lower than the first vertical height, and wherein the bead breakers of the plurality of bead breakers at the working position are configured to operate simultaneously on the second bead of the tyre.

11. The apparatus according to claim 1, wherein the axis of rotation is parallel to the weight force and the wheel-holder unit comprises:

a rotary rod, rotatable about the axis of rotation and having a hole at the top of it;

a locking device having a lower end and an upper end, where the hole at the top of the rotary rod is adapted to receive the lower end of the locking device, to lock the rim at a position between the top of the rod and the upper end of the locking device;

a plurality of turrets, disposed around the rotary rod, equidistant from the axis of rotation and rotating about the axis of rotation as one with the rotary rod.

12. The apparatus according to claim 11, wherein the turrets of the plurality of turrets are movable radially relative to the axis of rotation between a plurality of operating positions.

13. The apparatus according to claim 11, wherein the wheel-holder unit includes a plate, oriented perpendicularly to the axis of rotation and connected to a rotary shaft to rotate about the axis of rotation, wherein the rotary rod and the turrets of the plurality of turrets are supported by the plate, wherein the plurality of tools includes a plurality of lower bead breakers configured to interact with a bottom sidewall of the tyre and controlled by respective actuators of the plurality of actuators to move between a rest position, where they are located at a vertical height below the plate, and a working position, where they are located at a vertical height above the plate, to interact with the tyre.

14. The apparatus according to claim 1, wherein the axis of rotation is oriented perpendicularly to the weight force, and wherein the first actuator is associated with the wheel-holder unit to move it in parallel with the axis of rotation and wherein the second actuator is associated with a tool of the plurality of tools to move it towards and away from the wheel-holder unit.

15. The apparatus according to claim 1, comprising:

a tool-holder column oriented in parallel with the weight force;

a working unit which is slidably coupled to the column to move along a lifting axis, parallel to the weight force and to rotate around the tool-holder column;

a first and a second tool-holder assembly, connected to the working unit and extending away from the tool-holder column along respective angularly spaced directions.

16. A method for demounting a tyre from a respective wheel rim, comprising the following steps:

receiving and locking the wheel to a wheel-holder unit;

rotating the wheel about an axis of rotation by means of the wheel-holder unit;

moving a plurality of tools, wherein one or more tools of the plurality interact with the tyre to demount the tyre;

synchronously driving a plurality of hydraulic actuators by means of a hydraulic circuit comprising a pump and connected to the actuators of the plurality of actuators, and automatically realigning the actuators of the plurality of actuators, wherein the step of automatically realigning comprises opening one or more electrovalves located in respective one or more realignment branches of the hydraulic circuit to establish fluid communication between the actuators of the plurality of actuators, wherein the one or more electrov-
alves are opened through an electronic card, respon-
sive to a predetermined event, wherein a number of
electrovalves is equal to the number of actuators of
the plurality of actuators and wherein for each elec-
trovalve, a calibrated throttle located in the respec-
tive realignment branch.

17. The method according to claim 16, wherein the
plurality of actuators includes a first actuator and a second
actuator, wherein each first actuator and second actuator
defines an internal space and includes a piston which is
slidable inside the internal space, wherein the piston divides
the internal space into an opening chamber and a second,
closing chamber, wherein the step of driving the first actua-
tor and the second actuator comprises the following steps:
  feeding pressurized fluid to the opening chamber of the
    first actuator;
  by the effect of the pressurized fluid in the opening
    chamber of the first actuator, moving the piston of the
    first actuator and pressurizing the fluid in the closing
    chamber of the first actuator;
  causing the pressurized fluid to flow from the closing
    chamber of the first actuator to the opening chamber of
    the second actuator through a connecting branch which
    interconnects the closing chamber of the first actuator
    with the opening chamber of the second actuator.

18. An apparatus for mounting and demounting a tyre
relative to a corresponding wheel rim, wherein the apparatus
comprises:

a wheel-holder unit, configured to receive and lock the
  wheel at an operating position and to set it in rotation
  about an axis of rotation;
a plurality of tools, configured to interact with the tyre to
  mount and/or demount the tyre;
a hydraulic circuit comprising a pump (9);
a plurality of hydraulic actuators, connected to the
  hydraulic circuit, wherein each actuator of the plurality
  of actuators defines an internal space and includes a
  piston which is slidable inside the internal space,
  wherein the piston divides the internal space into an
  opening chamber and a closing chamber,
  wherein the hydraulic circuit is configured to drive the
    actuators of the plurality of actuators synchronously,
    wherein the hydraulic circuit comprises a rephasing
    system, configured to automatically realign the
    actuators of the plurality of actuators, wherein the
    rephasing system comprises an electronic card and
    one or more electrovalves positioned in respective
    one or more realignment branches of the hydraulic
    circuit, wherein the electronic card is programmed to
    open the one or more electrovalves, responsive to a
    predetermined event, to establish additional fluid
    communication between the actuators of the plural-
    ity of actuators, wherein the rephasing system
    includes, for each electrovalve, a calibrated throttle
    located in the respective realignment branch.

* * * * *